United States Patent [19]
Juds

[11] Patent Number: 5,463,384
[45] Date of Patent: Oct. 31, 1995

[54] COLLISION AVOIDANCE SYSTEM FOR VEHICLES

[75] Inventor: Scott Juds, Seattle, Wash.

[73] Assignee: Auto-Sense, Ltd., Denver, Colo.

[21] Appl. No.: 208,503

[22] Filed: Mar. 9, 1994

Related U.S. Application Data

[63] Continuation of Ser. No. 623,725, filed as PCT/US90/01961, Apr. 10, 1990, abandoned.

[51] Int. Cl.⁶ ..................................................... G08G 1/16
[52] U.S. Cl. ........................................... 340/903; 340/435
[58] Field of Search .................................. 340/901, 902, 340/903, 904, 555, 556, 557, 435, 952, 433, 942; 364/461; 342/53; 180/169; 250/227

[56] References Cited

U.S. PATENT DOCUMENTS

| | | | |
|---|---|---|---|
| 4,479,053 | 10/1984 | Johnston | 250/221 |
| 4,674,073 | 6/1987 | Naruse | 340/904 X |
| 4,694,295 | 9/1987 | Miller et al. | 340/903 |
| 4,737,625 | 4/1988 | Sasaki et al. | 250/221 |
| 4,825,211 | 4/1989 | Park | 340/901 |
| 4,851,661 | 7/1989 | Everett, Jr. | 250/221 |
| 4,926,170 | 5/1990 | Beggs et al. | 340/904 |

*Primary Examiner*—Hezron E. Williams
*Assistant Examiner*—Christine K. Oda
*Attorney, Agent, or Firm*—David A. Greenlee

[57] ABSTRACT

A collision avoidance system includes an object detection module (50) mounted on a vehicle (54) for detecting the presence of an object (68) within a monitored zone of space (56) adjacent the vehicle (54). The detection unit (50) emits a plurality of beams (66) of infrared energy and detects the reflection of such energy from objects (68) within the zone. The detection module (50) is typically activated by the host vehicle's electrical turn signal. The detection module (50) includes a plurality of associated pairs of light emitting diodes (134) and photosensitive detectors (128) for sensing the reflected light.

18 Claims, 15 Drawing Sheets

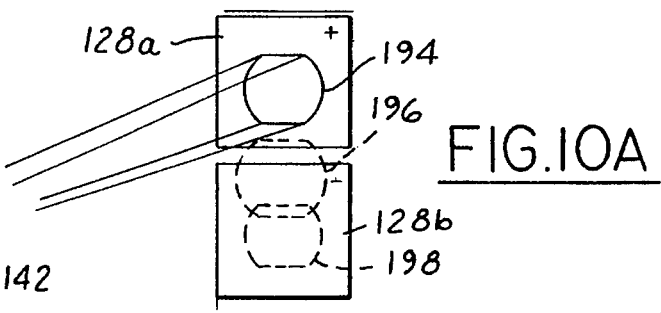
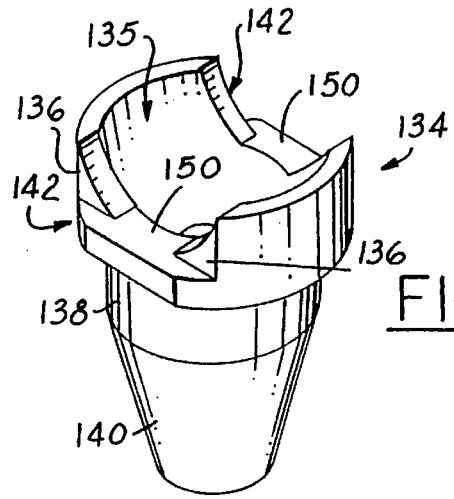
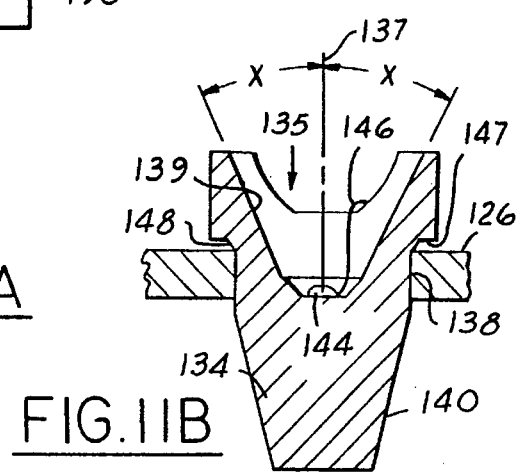
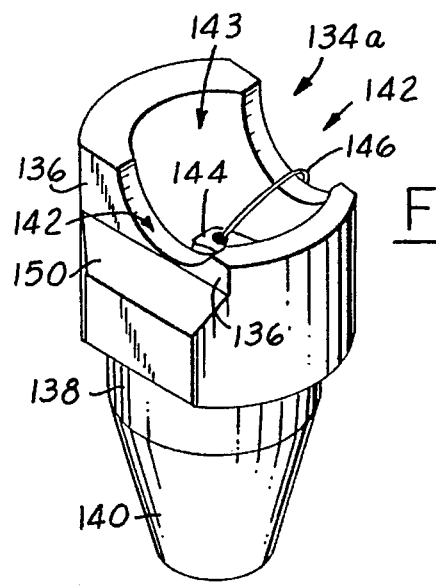
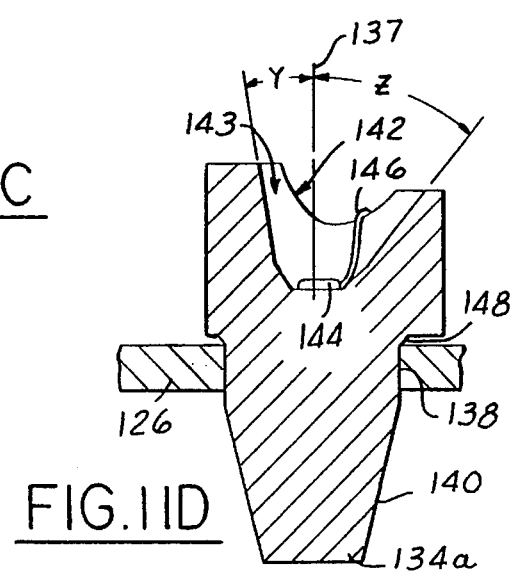
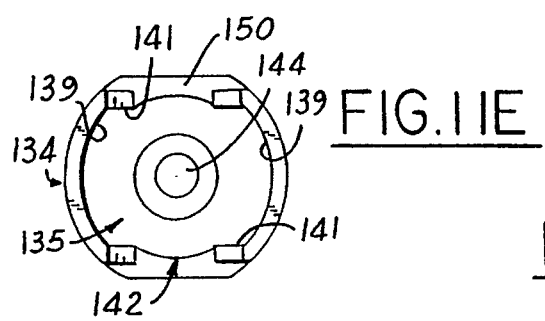
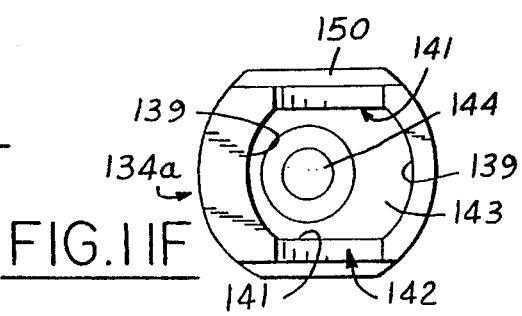

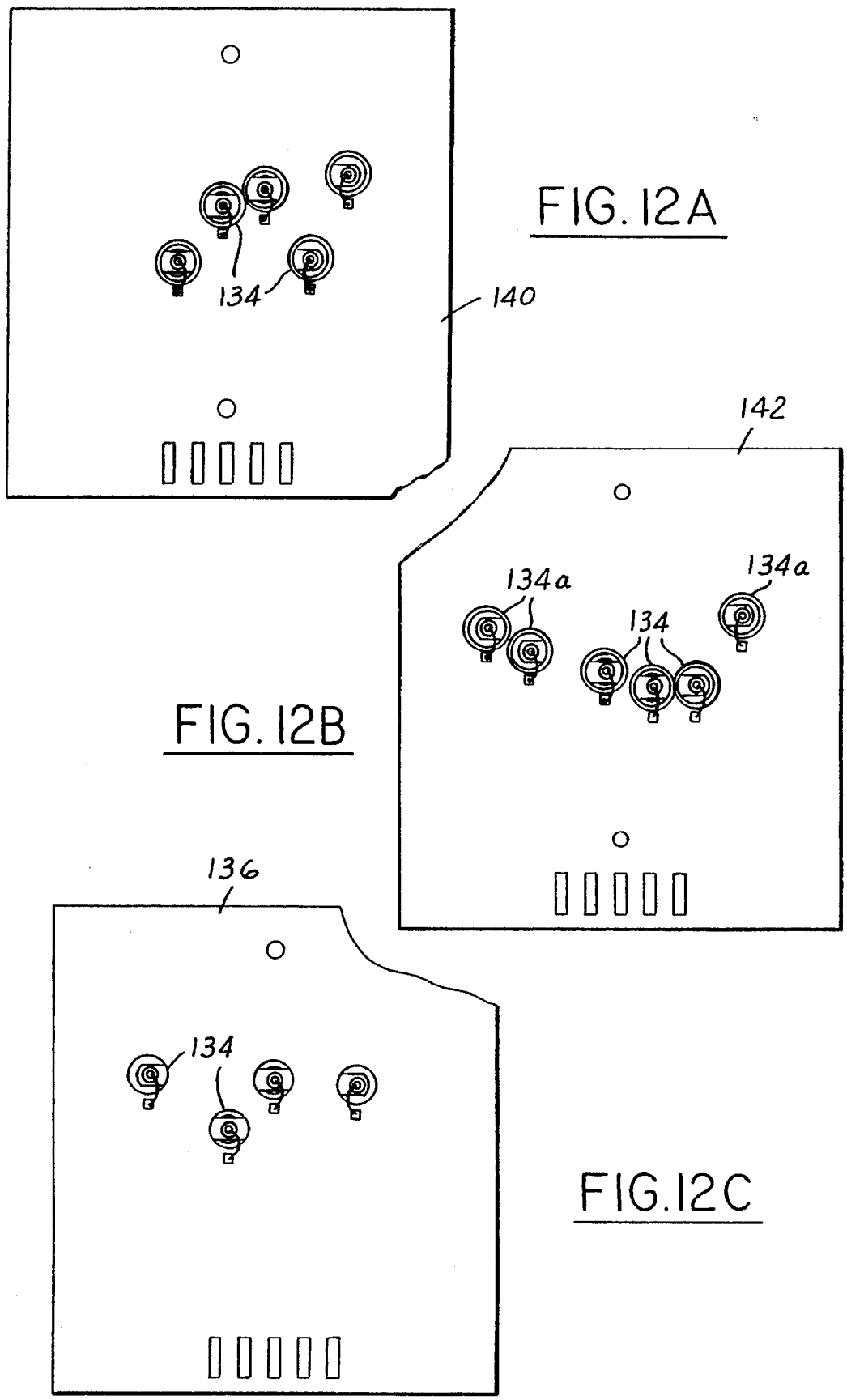

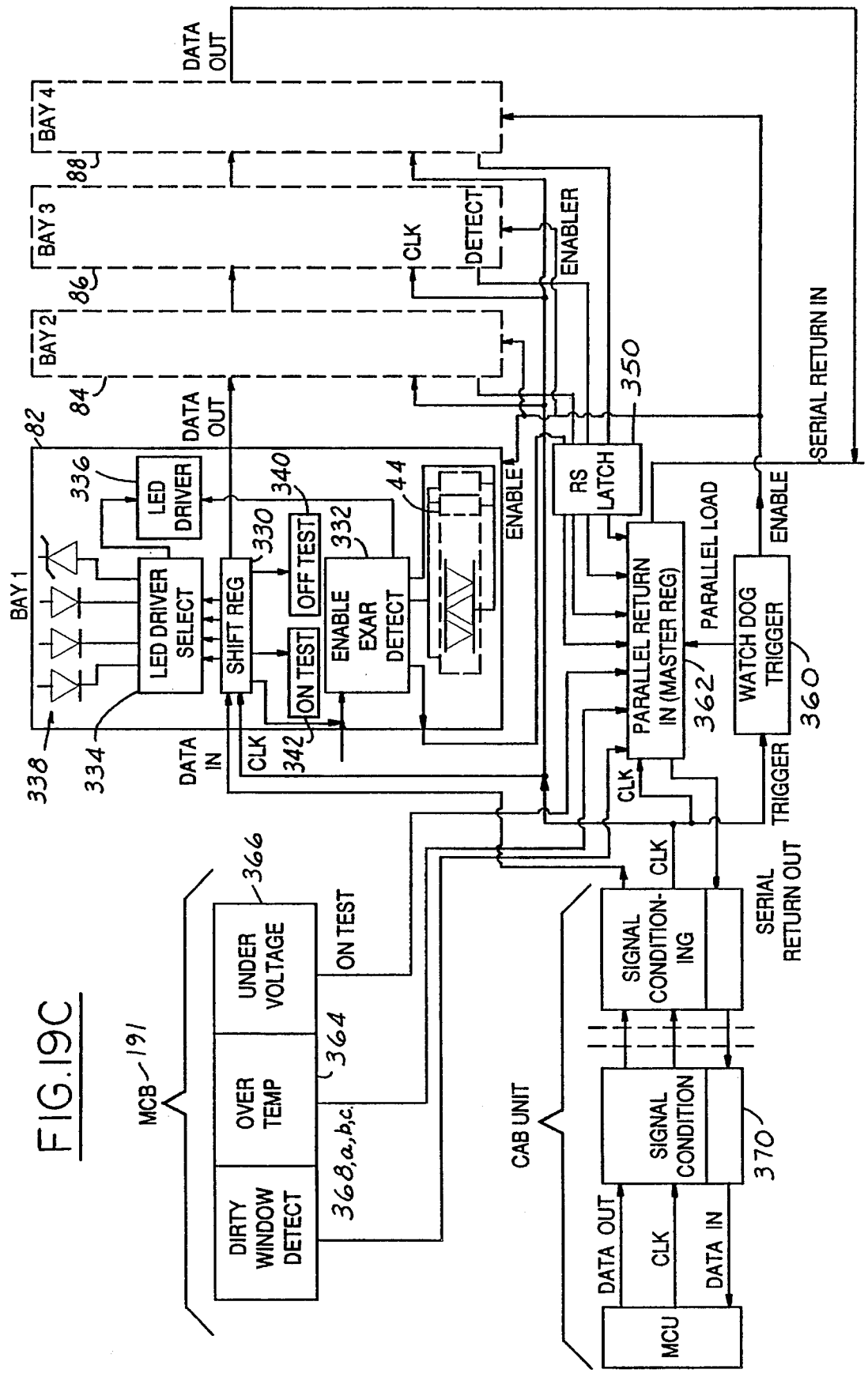

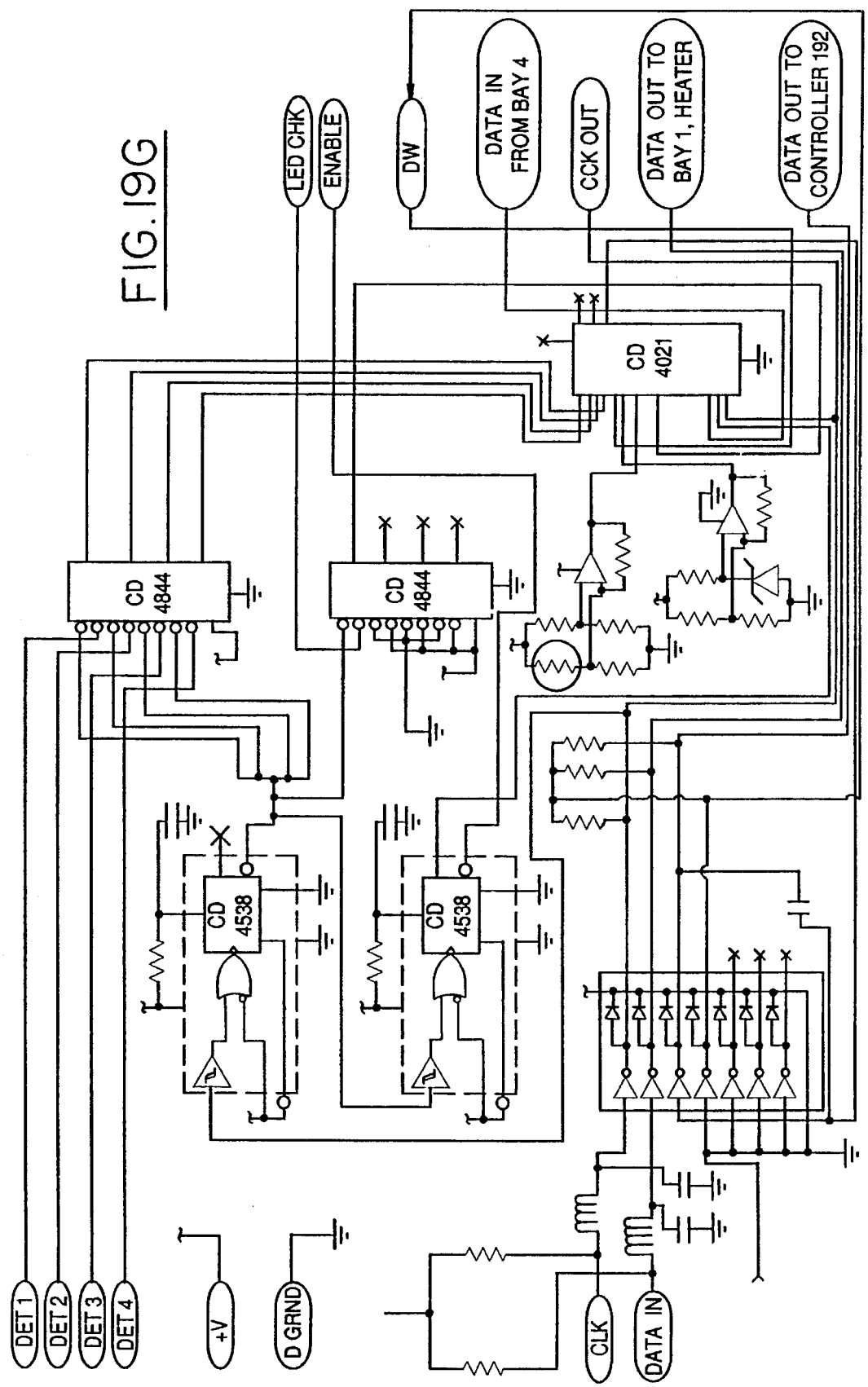

COLLISION AVOIDANCE SYSTEM FOR VEHICLES

RELATED APPLICATIONS

This is a continuation of U.S. patent application Ser. No. 07/623,725, filed as PCT/US90/01961 Apr. 10, 1990, now abandoned.

TECHNICAL FIELD

The present invention broadly relates to object detection systems, and deals more particularly with a system for detecting the proximity of vehicles and other objects adjacent a host vehicle in order to avoid collisions.

BACKGROUND ART

Various types of collision avoidance systems for vehicles have been proposed in the past, using various types of technologies, including ultrasonics, electro-optics and microwaves. Many of these systems are less than completely satisfactory for any of several reasons. Some of these systems, while quite effective in operation, are prohibitively expensive in terms of manufacturing costs to render them suitable for use on a widespread basis. Others suffer from operating deficiencies, including the tendency to yield an undue number of false detections or the failure to properly detect a vehicle or object which poses a risk of collision. For example, microwave system, i.e., radar, are relatively costly to manufacture, tend to pollute the environment over the electromagnetic spectrum if utilized on a wide spread basis and have limited ability to control the directivity of the beam energy to reasonably sized detection areas. The electrostatic membrane transducers used in ultrasonic systems for coupling energy to and from the air are fragile and present a risk of being damaged in a road environment. Moreover, the piezoelectric ceramic devices used in ultrasonic systems possess poor energy coupling efficiency and therefore cannot provide the target sensing range that is required in many road vehicular applications.

The problems mentioned above are exacerbated by the diverse types of environmental conditions and terrain under which vehicles are normally used. Objects or features such as highway signs, curbs and line markings on the pavement may give rise to false detection signals. On the other hand, weather conditions involving rain, snow, fog, etc. may impair the effective "vision" of the collision avoidance system to the point that it is unable to detect objects or vehicles posing a risk of collision. Further, in order to reliably detect objects or vehicles posing a risk of collision, it is necessary to define with some degree of precision the zone intended to be monitored. One zone that is of particular interest is that normally referred to as the vehicle operator's "blind spot." An operator's blind spot will, of course, vary from vehicle to vehicle. In some cases, the vehicle operator is unable to detect the presence of an object or vehicle in the blind spot, either due to his line of sight being physically blocked or an inability to view the area within the blind spot by means of mirrors or the like. In other applications, the blind spot may comprise a relatively substantial area, as in the case of large tractor-trailer vehicles. In these applications, various types of sophisticated mirror systems have been devised so that the operator may view most if not all of the area within the blind spot; however, these systems employ multiple mirrors, and it may be quite difficult for the operator to quickly view all of these mirrors in order to see all portions of the blind spot area before he executes a change of lanes. Moreover, some of these mirrors are convex or horizontal in configuration which actually distort the view by altering the apparent range and/or orientation of the scene.

Complicating the problems mentioned above is the fact that vehicle operators sometime become lackadaisical in using the normal means available to them for areas within or adjacent to the blind spot. An operator may easily overlook the presence of a small object or vehicle, such as a bicycle or motorcycle within the blind spot, if he merely quickly glances at his sideview or rearview mirrors.

The present invention is directed to overcome all of the deficiencies mentioned above.

SUMMARY OF THE INVENTION

In accordance with the present invention, a collision avoidance system is provided for use on a host vehicle in order to detect the presence of an adjacent vehicle or object within a monitored zone, which may be defined by the operator's visual blind spot. According to one aspect of the invention, the collision avoidance system employs a plurality of detector modules mounted on the host vehicle in preselected relationship to each other, wherein each module includes a plurality of sensor systems, including means for emitting a beam of radiant energy into a portion of the monitored zones and means for sensing radiant energy reflected from a vehicle or object within the zone which originates from the emitting means. Means coupled with each of the modules is provided for analyzing data generated by each of the sensor systems in order to determine whether a vehicle or object is present in the monitored zone.

In one embodiment of the invention, the beams of radiant energy are arranged so as to respectively extend forwardly, laterally and rearwardly from a mounting location along the side of the host vehicle. The detector modules are mounted within a single housing which, in one embodiment, is mounted on the side of the host vehicle, although other mounting locations are contemplated, including integration of the detector modules into a taillight assembly, for example, of the host vehicle.

Each of the detector modules preferably includes a first optical lens for focusing radiant energy from a plurality of the emitting means and a second optical lens for focusing radiant energy reflected from an object or vehicle in the zone to a plurality of sensors.

Each of the emitting means includes a unique mounting device for mounting an LED on a printed circuit board in a manner such that all of the LEDs are in preselected physical relationship to each other and focus the emitted light in a beam at a preselected angle relative to the monitored zone, so that the beams respectively possess unique orientations relative to each other.

A monitor system within the passenger compartment or cab of the vehicle includes visual and audible alarms to alert the vehicle operator in the event that an object or vehicle is detected. A detector is provided for sensing the presence of an accumulation of frost or condensation on the housing of the detector modules and may also detect weather conditions such as fog or snow in order to alert the vehicle operator that the system may be incapable of properly detecting vehicles within the monitored zone due to weather conditions. Frost accumulation on the exterior of the detector module housing is eliminated by means of a unique heater system which is temperature-activated.

The emitted beams of radiant energy are defined by optical radiation within the infrared zone. A unique modulation system effectively keys the emitted beams so that the reflected energy can be easily detected and also affords a relatively low duty cycle in order to increase the life of system components.

According to another aspect of the invention, collision avoidance apparatus is provided for use on a host vehicle for detecting the presence of any of a plurality of different, adjacent vehicles within a monitored zone, comprising means for emitting a plurality of beams of energy into the zone where at least certain of these beams are positioned so as to be incident on predetermined reflective features on and common to all of said plurality of said vehicles, and means for detecting energy originating from the beams and reflected from such predetermined surface features. The beams are positioned at angles which avoid detecting reflected energy from surface features on the road, reflective striping on the road or curbs. Certain of the beams may be directed rearwardly from the host vehicle so as to pass through the windshield of an adjacent vehicle and impinge upon surface features within the interior of the adjacent vehicle. The detecting means includes means for preventing the detection of energy reflected from features disposed greater than a predetermined distance from the detecting means. The detecting means includes a plurality of sensors for respectively sensing reflections of energy wherein the sensing distance of at least certain of the sensors are different from the sensing distances of the other sensors.

According to still another aspect of the present invention, collision avoidance apparatus is provided for use on a host vehicle for detecting the presence of an object within a monitored zone adjacent the host vehicle, comprising means for emitting at least one beam of optical energy into the zone, detecting means for detecting optical energy originating from the beam and reflected from the object within the zone. The detecting means includes photoresponsive sensing means for producing a detection signal in response to impingement thereon of an image formed by the reflected energy, the magnitude of the detection signal being a function of the overlap of the reflected energy image and the photoresponsive sensing means. Also provide are means for tailoring the shape of the reflected image in a manner to alter the magnitude of the detection signal as to reduce the possibility of false detections. The tailoring means preferably includes means for shaping the beam in the nature of a reflective bowl surrounding the optical energy source.

Another aspect of the invention resides in a collision avoidance apparatus of the type employing light emitting diodes for producing a detection beam of optical energy used to detect the presence of objects within a monitored zone, wherein the light emitting diodes are mounted within a substantially enclosed housing and are subject to deterioration in performance when subjected to duly high temperature. The apparatus includes means for monitoring the temperature within the housing in order to detect the possible diminished performance of the light emitting diode.

Still another aspect of the present invention resides in collision avoidance apparatus for use with vehicles, generally as described above which includes means for heating selective areas of a cover on the housing to prevent accumulation of ice or the like which may prevent the passage of energy beams through the cover. More particularly, the cover is heated by means of an electrically conductive layer disposed on the inside of the cover, which conductive layer includes openings therein which register with energy transparent portions of the cover so that effectively the areas of the cover surrounding these energy transparent areas are heated to melt snow, ice and the like.

Another aspect of the present invention resides in a collision avoidance system as generally described above which includes means for directing a plurality of beams of energy into the zone, a plurality of detection means on the vehicle for respectively detecting the reflection of energy from the object, wherein each of the detection means generates a detection signal upon detection of the reflected energy, and means for sequentially scanning the detection means to determine whether a detection signal has been generated. A plurality of light emitting diodes are used produce the energy beams are pulsed on a periodic basis to produce the beams, and the detecting means are scanned between such pulses.

BRIEF DESCRIPTION OF THE DRAWINGS

In the drawings, which form an integral part of the specification and are to be read in conjunction therewith, and in which like reference numerals are employed to designate identical components in the various views:

FIG. 10A is a diagrammatic view of a photodetector pair with an image impinging thereon;

FIG. 11A is a perspective view of one form of the mounting elements for the emitter means;

FIG. 11B is a cross-sectional view of the mounting element of FIG. 11A, shown mounted within a printed circuit board;

FIG. 11C is a perspective view of another form of the mounting element;

FIG. 11D is a cross-sectional view of the mounting element shown in FIG. 11C, depicted mounted in a printed circuit board;

FIG. 11E is a plan view of the mounting element of FIG. 11A;

FIG. 11F is a plan view of the mounting element of FIG. 11C;

FIGS. 12A–D are plan views of printed circuit boards respectively of the detector modules, showing the layout and placement of the emitter means thereon;

FIGS. 19C–19G are detailed schematic diagrams of the electrical circuit for the detector.

DETAILED DESCRIPTION OF THE PREFERRED EMBODIMENTS

Figure 1:
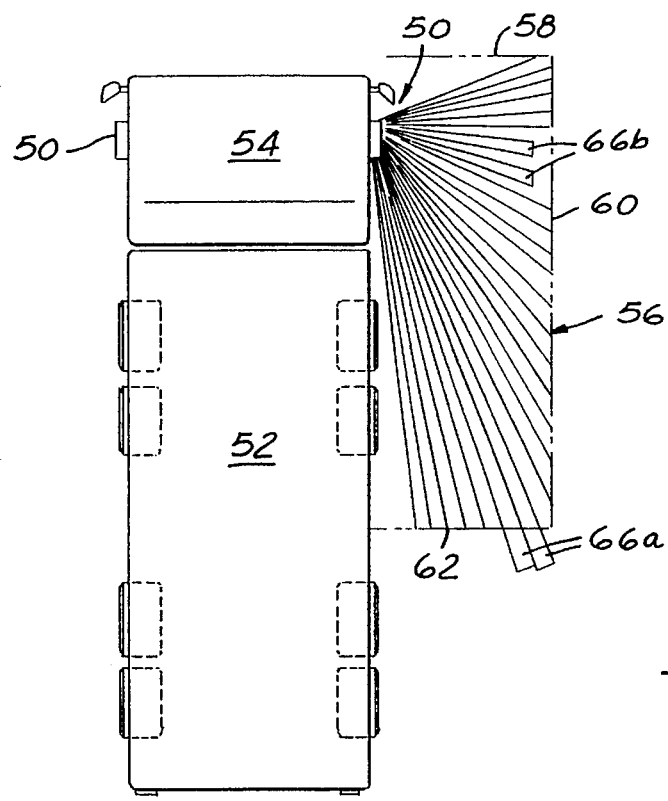
FIG. 1 is a plan view of a truck and trailer equipped with the collision avoidance system of the present invention and depicting one of the monitored zones adjacent the vehicle and the disposition of the radiant energy beams.
Figure 2:
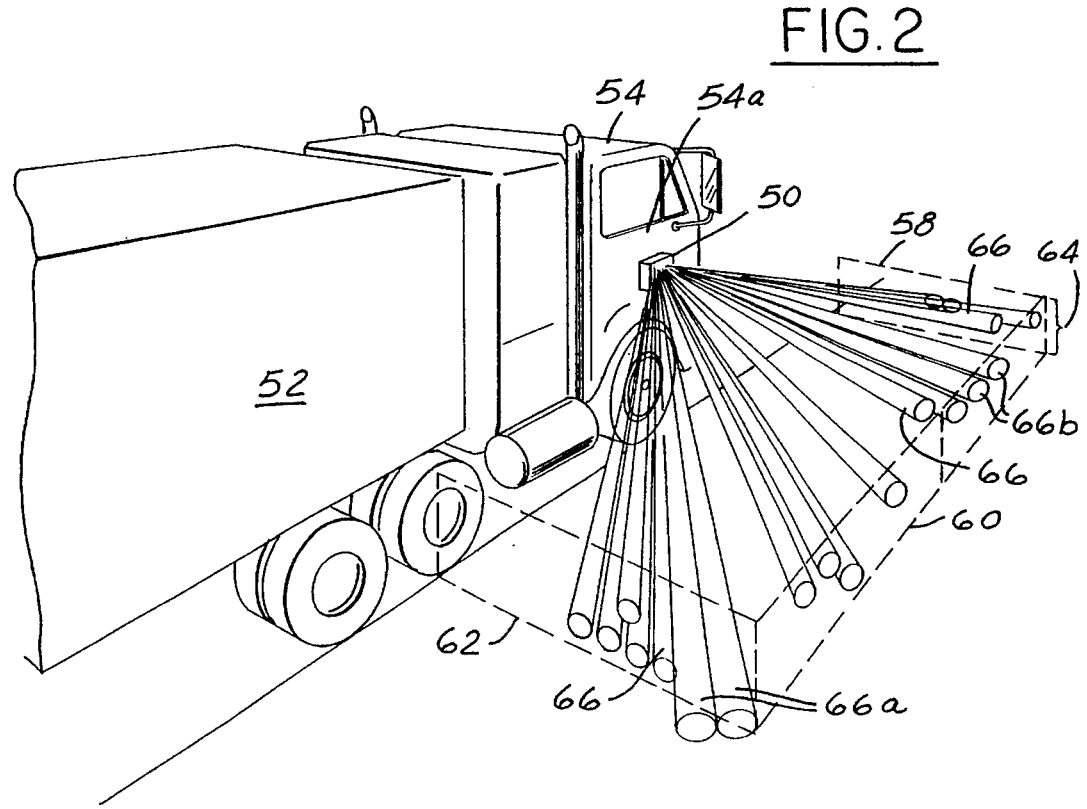
FIG. 2 is a rear, perspective view of the truck and trailer shown in FIG. 1, better showing the relative dispositions of the energy beams.

Referring first to FIGS. 1 and 2, the present invention broadly relates to a collision avoidance system for use with vehicles typically traveling on the open road. In connection with the presently disclosed embodiment of the invention, a tractor-trailer type vehicle is depicted comprising a tractor or truck 54 which tows a long trailer 52. Large trucks of this type are typically referred to as "Class 8" trucks, and because of their size and configuration, the operator of such a vehicle normally has a relatively large blind spot within which an adjacent vehicle may be concealed from his view, thus presenting a severe hazard during lane-changing maneuvers, turns and the like. In any event, it is to be expressly understood that the collision avoidance system of the present invention is readily adapted for use with various other types of vehicles other than trucks, as will become evident hereinafter.

The collision avoidance system of the present invention includes a collision avoidance detector 50 mounted on each side of the truck 54. As disclosed herein, the detector 50 is mounted on the door 54a of the truck cab; however, the precise mounting location may vary depending upon the nature, size and configuration of the truck or other vehicle. For example, the components of the detector 50 of the present invention may be mounted in a taillight, headlight, bumper, sideview mirror or the "C" pillar of the vehicle. In any event, since the details of the detectors 50 are identical, only the detector on the right side of the vehicle will be specifically discussed herein. In fact, it is presently believed that most "Class 8" truck configurations may not require the use of a detector 50 on the left side of the vehicle because the driver's visibility on the left side is relatively good and a blind spot may not be present on the left side. Other vehicles, however, may substantially benefit from the use of a detector 50 on the left side, depending on its size, configuration and the exact sitting position of the driver.

The detector 50 emits a plurality of beams 66 of radiant energy into a substantially rectangular zone 56 adjacent the truck 54 which may be sometimes referred to herein as the "host" vehicle. In the particular embodiment disclosed herein, twenty-one of the beams 66 are employed to detect the presence of an object or vehicle within the zone 56 that may pose a risk of collision with the host vehicle in the event of a turn or lane-changing maneuvers by the host vehicle. As is apparent from FIGS. 1 and 2, some of the beams are oriented to extend forwardly from the mounting location of the device 50, in the direction of travel of the host vehicle, while others extend substantially perpendicular to this path of travel and others extend rearwardly so that substantially the entire zone 56 is covered. The spacing between, location, direction and size of the beams 66 are carefully selected in accordance with the particular application to optimize system operation and assure all objects of interest within the zone 56 are properly detected. The beams 66 effectively define the zone 56 itself. In connection with one actual application of the present embodiment, for example, the zone 56 is approximately two feet above the road surface, possesses a width indicated at 62 of approximately 7.5 feet, and a length designated by the numeral 60 of approximately 18 feet. Approximately half of the beams 66 extend rearwardly from the detector 50, while the remaining beams extend forwardly.

In accordance with one aspect of the invention, the number, positioning and length of the beams 66 are carefully and strategically selected so as to maximize the probability that a vehicle or other object will be detected in the zone 56. This is achieved by positioning the beams 66 at angles, and in directions so as to most likely be incident on predetermined reflective features present on an common to at least some differing models of vehicles. For example, it has been learned that a high correlation of detection exists with respect to that angles at which optical energy is reflected from wheels, reflective side markers, door handles, trim pieces, bumpers, license plates and the like. By determining the elevation and placement of these common reflective features for a plurality of differently configured vehicles (i.e., different models) important insight can be gained as to the optimal positions and angles of beams needed to increase the probability that these common reflective features will be detected. Further, using the information concerning common reflective features between differing models, the optimal number of beams required to provide reliable detection can be determined so that the use of additional costly beams which are of marginal additional benefit, can be avoided.

As shown in FIG. 2, it can be seen that the beams 66 are strategically positioned so as to avoid false detections resulting from the detection of reflections from the road surface, reflective striping on the road, and adjacent curbs or the like. In other words, it is apparent from FIG. 2 that all of the beams 66 penetrate the space 56 being monitored at areas spaced above the road surface. Similarly, the outer lateral boundaries of the beams are essentially limited to the lateral boundary 60 so as to avoid the detection of adjacent curbs, street signs or vehicles in closely adjacent lanes. It has also been discovered that it may be desirable to detect the reflections from interior surface features of adjacent vehicles. For example, rearwardly extending beams 66a extend rearwardly beyond the monitored zone 56, and are disposed at an elevation so as to penetrate the windshield of an adjacent vehicle behind the rear boundary 62. The infrared beam penetrating the windshield is reflected off of various interior surface features, such as the seats of the vehicle, and the reflected energy is returned to the detector unit 50. This has been found to be particularly important in sensing the presence of vehicles approaching and entering the rear boundary 62 of the zone 56, since, because of the extreme surface angles typically found on the front end of vehicles it is quite difficult to reliably obtain reflections of energy from beams which are incident on these exterior front end features. Thus, it should be understood that the zone 56 being monitored is effectively a "nominal" zone and it may be desirable to actually detect surface features outside of the zone 56 in order to determine whether at least portions of an adjacent vehicle have in fact entered or is likely to enter the zone 56, and thus pose a risk of collision with the host vehicle. It has been further discovered that certain of the lateral beams, such as beams 66b are most likely to result in the detection of reflections from curbing and other features near the road surface. Accordingly, these particular beams 66b are shortened in length to preclude the possibility of detecting reflections from curbing and the like due to the particular angles of incidence of the beams 66b on the curbs.

In order to define the zone 56, means are provided for effectively limiting the sensitivity of the detection system to the confines of the zone 56. In other words, the system cannot "see" objects or vehicles outside of the zone 56. In this manner, false detections are avoided which would otherwise result from the system seeing curbs or adjacent vehicles which are two lanes away and do not present any danger of collision. This is accomplished by effectively using a beam cut-off technique which may be best described as follows with reference momentarily to FIG. 10A. Photosensitive elements 128a, 128b within the detector 50 are disposed in side-by-side relationship, wherein element 128b produces a negative signal and element 128a produces a positive signal. Radiant energy originating from one of the emitters producing the beams 66 is reflected from an object within the zone 56 as a reflected beam 72 (FIG. 3) and forms an image 194 which moves between the two photosensitive elements 128a, 128b in a linear path as a function of the distance of the object from the detector 50. As this distance increases, the impinging image 194 moves from the positive photosensor 128a to the negative one 128b, two successive positions of the image being indicated in the phantom and designated respectively as 196 and 198 with the amplitude of the electrical sensing signals produced by the negative and positive photosensors being proportional to the amount or area of the impinging image 194 which covers the respective photosensitive element 128a, 128b. These two sensing signals are processed by later-discussed electronic circuitry to determine whether a "detection signal" should be generated. As the object moves beyond the outer periphery of the monitored zone 56, the ratio of the sensed signals reaches a threshold below which a detection signal is no longer produced.

Figure 3:
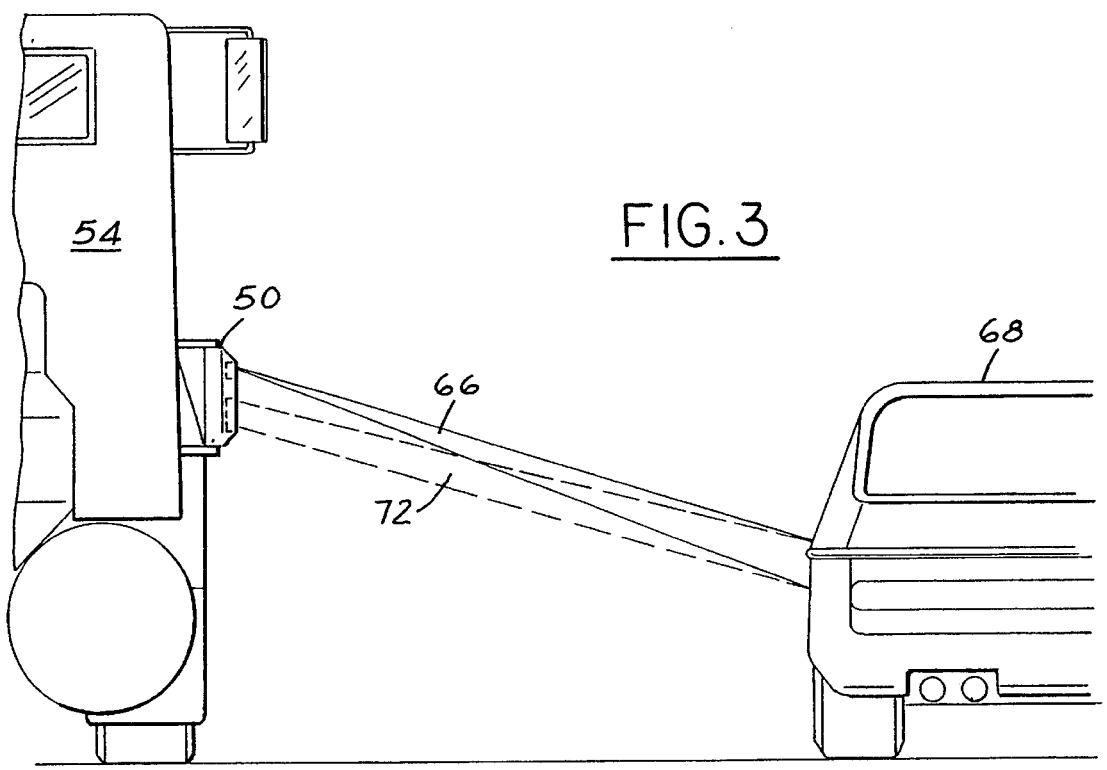
FIG. 3 is a rear elevational view showing a portion of the truck or host vehicle in FIG. 1 and an adjacent vehicle within the monitored zone.

Referring to FIG. 3, an outgoing beam 66 of radiant energy, typically in the infrared wavelength, is emitted from a portion of the detector 50 into the monitored zone 56 and impinges upon some portion of an adjacent vehicle 68 within the zone. This impinging radiant energy will be reflected in many directions, in accordance with the surface geometry of the vehicle 68, but at least a portion of it will be reflected back as a reflected beam 72 to a later-discussed sensor within the detector 50.

Figure 4:
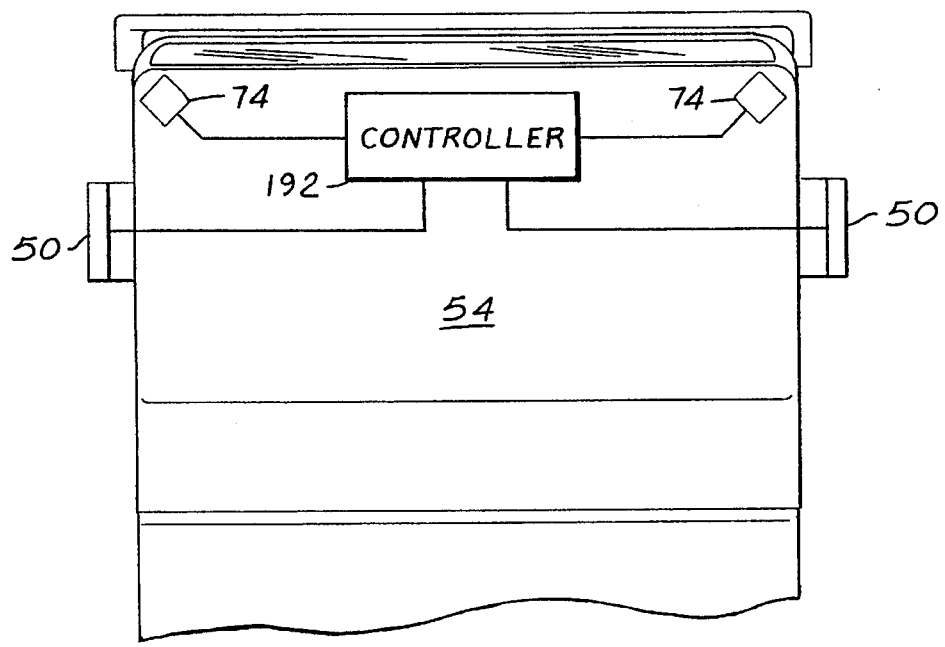
FIG. 4 is a plan view of the truck shown in FIG. 1, depicting the position of the controller and visual enunciators.

As shown in FIG. 4, the collision avoidance system broadly includes preferably a pair of the detectors 50 mounted on respective opposite sides of the truck 54, a central controller 192 mounted within the cab of the truck 54, at a position easily viewed by the driver, and a pair of visual enunciators 74 which are respectively mounted on opposite sides of and within the cab, generally near the rearview mirrors of the vehicle. Typically, the driver will use the collision avoidance system only during turns and lane-changing maneuvers when he activates a turn signal. Activation of a turn signal in turn enables one of the detectors 50 corresponding to the direction in which the driver intends to turn. In the event that the detector 50 senses a vehicle or other object within the monitored zone 56, the controller 192 produces an audible alarm to alert the driver, and the enunciator 74 on that side of the vehicle in the direction of the turn produces a visual signal, such as a flashing light, to further alert the driver.

Figure 6:
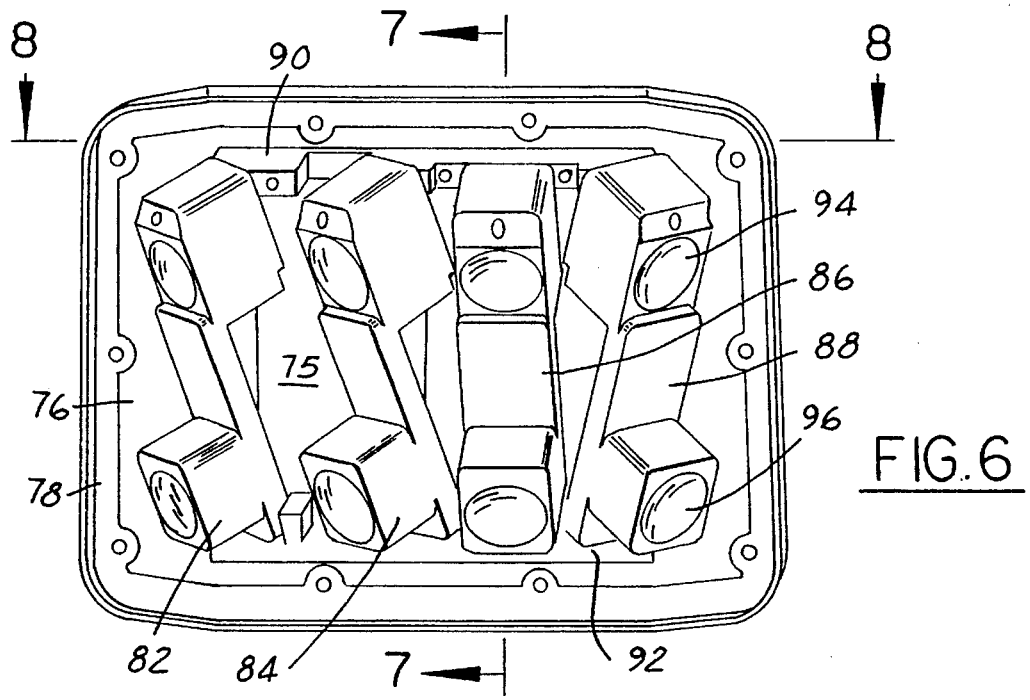
FIG. 6 is an elevational view of the front of one of the detectors, the outer cover having been removed to better display the detector modules.
Figure 5:
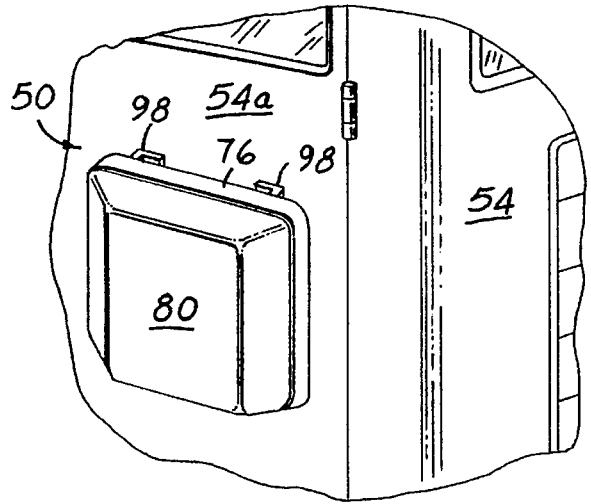
FIG. 5 is a perspective, fragmentary view of a portion of the truck shown in FIG. 1 depicting one of the detectors mounted on the door of the truck.
Figure 7:
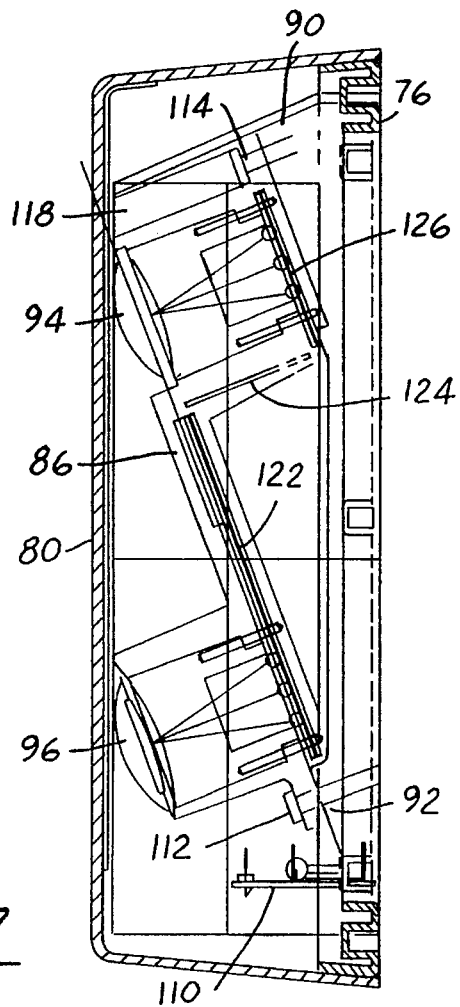
FIG. 7 is a sectional view taken along the line 7—7 in FIG. 6.
Figure 8:
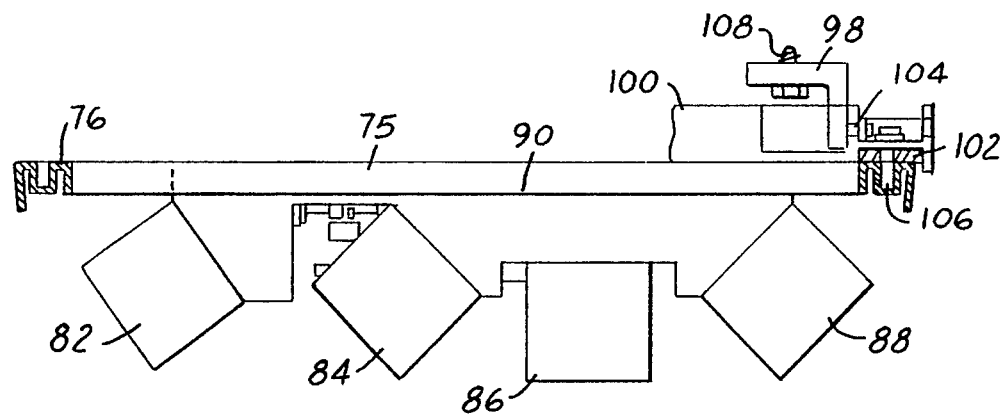
FIG. 8 is a sectional view taken along the line 8—8 in FIG. 6.

Reference is now made to FIGS. 5-8 which depict further details of one of the detectors 50. As shown in FIG. 5, the detector includes a back plate 75 having a substantially rectangular outer frame 76 which includes a channel for receiving the edge of an outer cover 80, which is preferably of an impact-resistant plastic that is transparent to optical radiation of the wavelength of interest. As best seen in FIGS. 5 and 8, the device 50 is mounted on the door 54a by means of a pair of mounting brackets 98 which are generally L-shaped in cross-section and are secured to the door 54a by means of screws 108. A back plate 100 is mounted on the flange 98 by means of mounting screws 104. The frame 76 is in turn mounted on the back plate 100 by means of a second set of screws 106 which extend through the back plate 100 and a gasket 102 into the outer frame portion 76.

The detector 50 includes a plurality of detector modules 82-88 which are secured in preselected positions to the back plate 76 by means of a pair of spaced apart mounting brackets 90 and screws 112 and 114.

Figure 9:
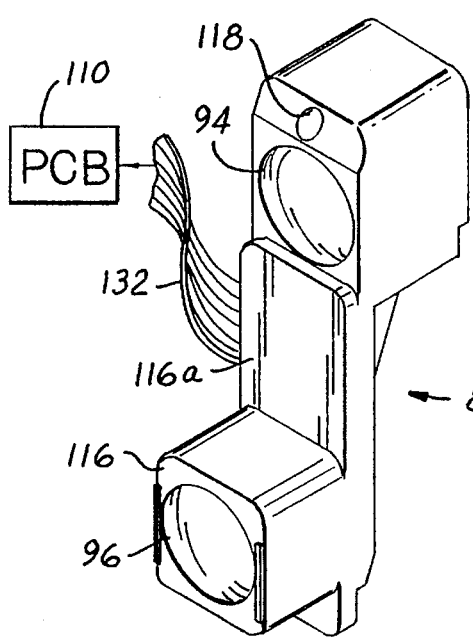
FIG. 9 is a perspective view of one of the detector modules.
Figure 10:
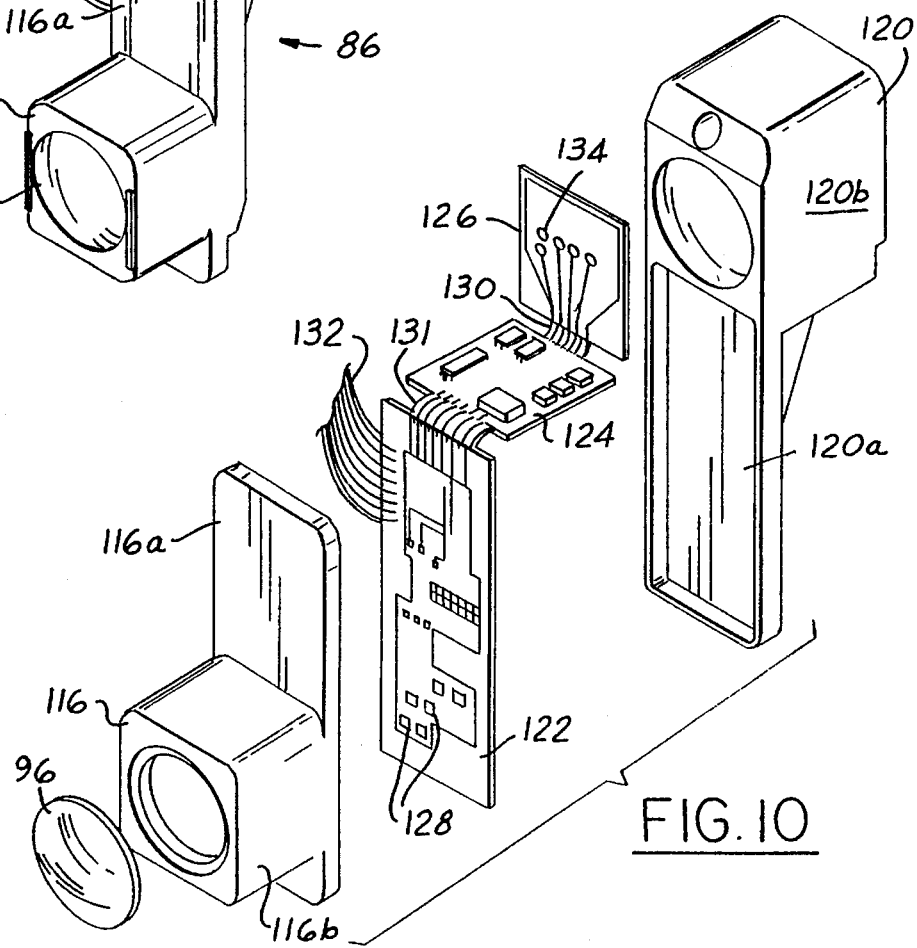
FIG. 10 is an exploded, perspective view of the detector module shown in FIG. 9.
Figure 12D:
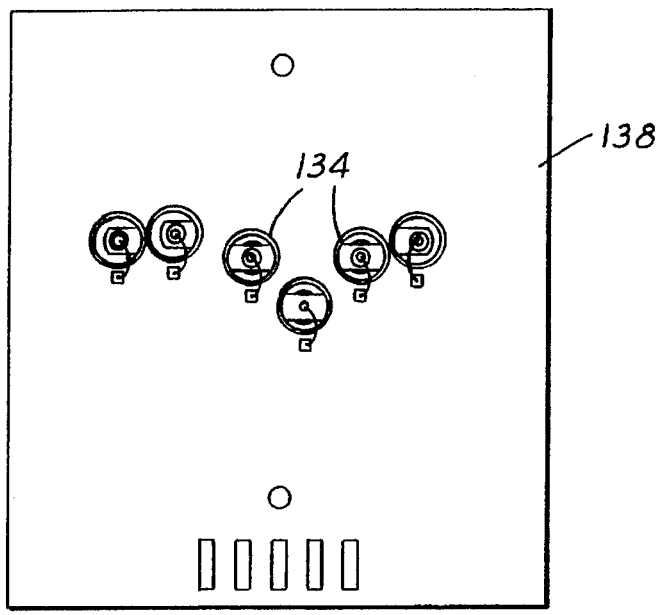

As best seen in FIG. 6, the detector modules 82-88 are fixedly and differently oriented relative to each other in order to achieve proper aiming of the beams 66. As shown in FIGS. 9 and 10, each of the detector modules 82-88 includes a housing comprising first and second body portions 116, 120, preferably formed of plastic, which are secured together by any suitable means such as an adhesive. The body portions 116, 120 include overlapping legs 116a, 120a and hollowed end sections 116b, 120b within which there are respectively formed circular apertures that are covered by first and second optical lenses 94, 96.

Preferably, however, each of the modules 82-88 is molded as an integral, one-piece member, rather than as two separate pieces, as shown. This is accomplished by first placing later discussed printed circuit boards (PCB's) 122, 124 and 126 in a fixture within a mold die so that they are held in preselected position prior to and during the molding operation, and then introducing plastic molding material into the mold die. In this manner, the PCB's 122, 124, 126 are integrally molded within and are held in proper, position by the plastic material forming the module. This approach obviously eliminates the need for individually adjusting the positions of the individual PCB's 122-126 within the corresponding modules, eliminates the need for individual assembly of the components and substantially reduces the possibility that the PCB's 122-126 will later become loose in their mountings due to road vibration and the like, which would otherwise affect the optical alignment between later discussed infrared emitters 134 and their respectively associated photosensitive detectors 128.

Referring particularly now to FIGS. 7 and 10, mounted within the end section 120b, behind the first optical lens 94, is a printed circuit board 126, which includes a plurality of later-discussed light-emitting means 134, each operative to emit light of a preselected wavelength, preferably in the infrared region. The light emitted by each of the light-emitting means 134 is directed through the first lens 94 to form corresponding ones of the beams 66, the angle and positions of these beams being determined by the optical characteristics of the lens 94 as well as the construction details and the placement of the emitting means 134 relative to each other. As best seen in FIG. 7, the printed circuit board 126 is mounted on a rear wall of the end section 120b, substantially perpendicular to the optical axis of the lens 94. Mounted on a bottom wall of the end section 120 is an additional printed circuit board containing later-discussed processing circuitry which is connected to the light-emitting means 134 by way of flexible connecting wires 130.

Sandwiched between the legs 116a, 120a is a third printed circuit board 122 which is connected to printed circuit board 124 by flexible interconnect wires 131. PCB 122 includes additional electronic processing circuitry as well as a plurality of photosensitive devices 128. The photosensitive devices 128 are positioned behind the second lens 96, so that the lens 96 directs light energy reflected from an object within the monitored zone 56 onto the photosensitive devices 128.

As has been previously discussed with reference to FIG. 10A, the photosensitive devices 128 are arranged in adjacent pairs 128a, 128b, each pair being operative to sense light reflected from an object within the monitored zone 56, which originates from a corresponding LED beam with a radiation pattern nearly identical to the photodetector pair field-of-view. The photosensitive devices 128 may be of any of various conventional types, and in connection with the preferred embodiment disclosed herein, are responsive to light energy in the infrared wavelength range. Device 128a is operative to produce a positive signal when infrared light impinges thereon, while device 128b is operative to produce a negative signal upon impingement of infrared light thereon. The photosensitive devices 128a, 128b are physically arranged relative to the second lens 96 so that they effectively view adjacent areas within a chosen one of the beams 66. The lens 96 focuses a reflected image 194 on the devices 128a, 128b, the position of the image 194 being a function of the distance of the detected object from the devices 128a, 128b. When the object is within the boundaries of the monitored zone 56, the impinging image 194 is positioned wholly or mostly on the positive photosensitive device 128a, thus producing a positive signal of preselected value. As the distance between the devices 128a, 128b and the object to be detected increases, the position of the impinging image on the devices 128a, 128b moves toward the negative device 128b, two of these positions being indicated in the phantom and designated by the numerals 196, 198. Image 196 can be seen to partially overlap both the positive and negative devices 128a, 128b, thus producing both positive and negative signal responses. With the image at position 198, a purely negative signal is produced. The positive and negative signals are processed by later-discussed circuitry using threshold techniques and/or comparators to compare these signals with reference values. When these signals are in preselected relationship to the reference values, corresponding to a situation in which the object is within the monitored zone 56, a positive detection is produced. However, when the object is beyond the monitored zone 56, the signals are no longer in such preselected relationship, and positive detection is precluded. By this method, the boundaries of the zone 56 are relatively sharply defined, and false detection signals are substantially eliminated since objects beyond the cut-off range of the sensor system will not be detected.

From the above, it is apparent that the magnitude of the detection signal is a function of the relative overlap between the reflected image 194 and the photoresponsive devices 128a, 128b. Later discussed means are provided for tailoring the shape of the reflected image 194 in a manner to alter the magnitude of the detection signal so as to reduce the possibility of false detections. In the present embodiment, the tailoring means shapes the reflected image 194 so as to be generally oval, but truncates the outer, opposite ends of the image 194 so as to effectively produce a more sharply defined detection signal cut-off which substantially reduces the possibility of false detection signals due, for example, to the detector "seeing" a highly reflective side marker on a vehicle outside of the detection zone, which side marker falls within the truncated portion of the reflected image 194 and which would otherwise cause, because of the intensity of the reflected energy produced thereby, a detection signal response on the positive photosensor 128a which falsely leads the detection circuitry to believe that an object is in fact present within the monitored zone. In other words, an unduly large response produced within a relatively small portion of the reflected image 194 can result in an anomaly which causes a false detection signal. However, because of the truncation of the outer ends of the oval shaped reflected image 194, the potential for such an anomaly and resulting false detection signal is substantially reduced. It should be noted here that various other techniques may be employed for reducing false detection signals caused by similar phenomenon. Several of such alternate techniques are described in U.S. Pat. No. 5,354,983, issued Oct. 11, 1994, the entire disclosure of which is incorporated herein by reference.

Reference is now made to FIGS. 11A–11D which depict the details of two versions 134, 134a of the light-emitting means previously discussed in connection with FIGS. 7 and 10. A first version of the mounting element is depicted in FIGS. 11A, 11B and 11E and is generally denoted by the numeral 134. The mounting element 134 includes a cylindrical skirt 138 which is adapted to be tightly received within an aperture in the printed circuit board 126. A tapered portion 140 facilitates rapid centering and automatic insertion into the PCB 126. A small chamfer 148 between the skirt 138 and shoulder portion 147 engages the top of the PCB 126 and assists in assuring proper centering and thus a correct mounting position of the mounting element 134. The upper portion of the mounting element 134 includes a central cavity 135 therein which is essentially symmetrical in one direction relative to its central axis 137. The cavity 135 is defined by a pair of curved end walls 139 and a pair of generally straight side walls 141. The end walls 139 include a cut-out or scalloped portion 142 therebetween and a pair of spaced-apart, essentially flat surfaces 150. A light-emitting diode 144 is mounted, as by adhesives on a flat bottom surface within the cavity 135, in a central position coaxial with the longitudinal axis 137. A fine electrical wire 146 is connected to the LED 144 and extends upwardly and laterally through the cut-out portion 142 so as to be bondable to a printed circuit path on the PCB 126.

As best seen in FIG. 11E, the geometry of the cavity 135 and related features shown in plan view are symmetrical about the central axis 137 (FIG. 11). Thus, the light-emitting means 134 produces a beam of infrared light energy which is essentially symmetric about the axis 137.

The light-emitting means 134a shown in FIGS. 11C, 11D and 11F is essentially similar to that shown in FIGS. 11A, 11B and 11E, with the following exceptions. The inclination of the end walls 139 relative to the longitudinal axis 137 are different from each other, with one wall being inclined at an angle "y," and the other wall being inclined at a substantially greater angle "z," where "y" is less than angle "x" shown in FIG. 11B, and angle "z" is greater than angle "x." As a result of this latter-mentioned configuration. The beam produced by the emitting means 134a effectively emerges at an angle, here, 15 degrees, relative to the central longitudinal axis 137. Due to the geometry of the mounting elements 134, 134a, and particularly the configuration of the end walls 139 and the flat sides 141, the resultant image applied to the photoresponsive sensors 128a, 128b (FIG. 10A) produces much sharper cut-off of the excess gain produced by the sensors compared, for example, with a circular spot image which results in a slower, less pronounced cut-off as the image moves from the positive to negative sensor.

FIGS. 12A–12D illustrate the relative mounting positions of the mounting elements 134–134a on the printed circuit boards 136–142 associated with the corresponding detection modules 82–88.

Figure 13:
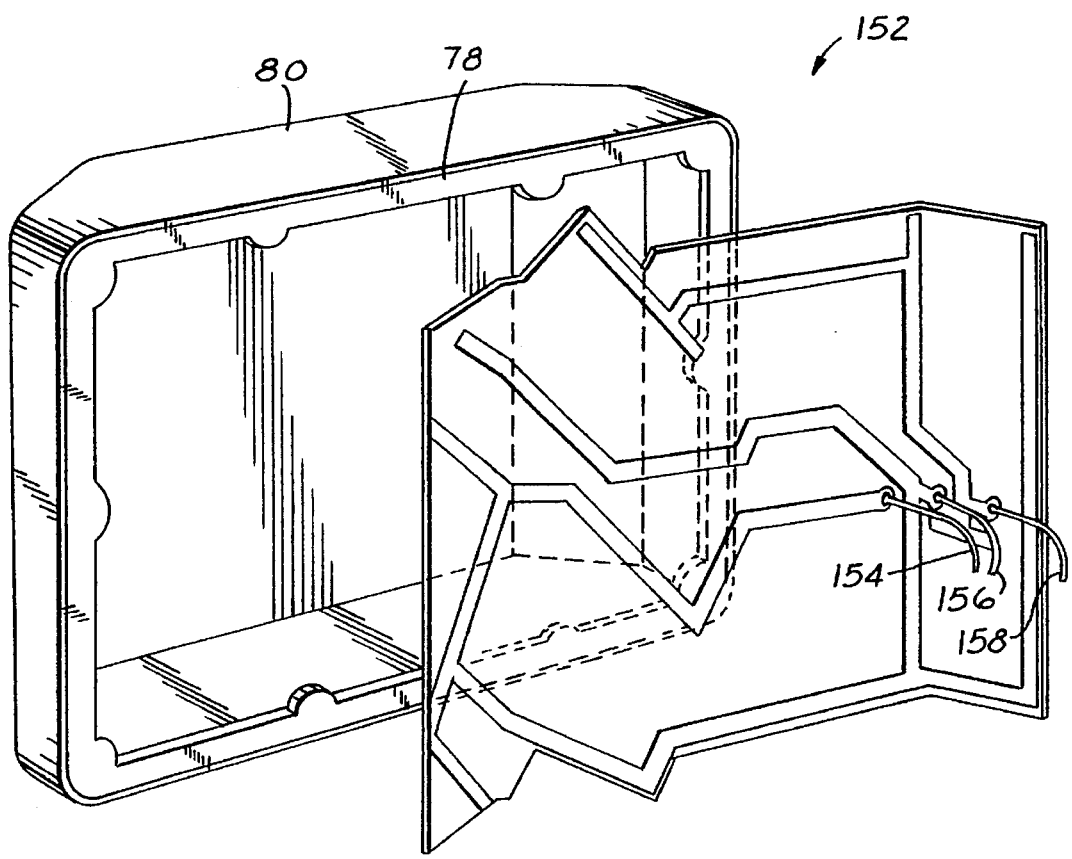
FIG. 13 is an exploded, perspective view of the rear face of the housing and the heater assembly.
Figure 14:
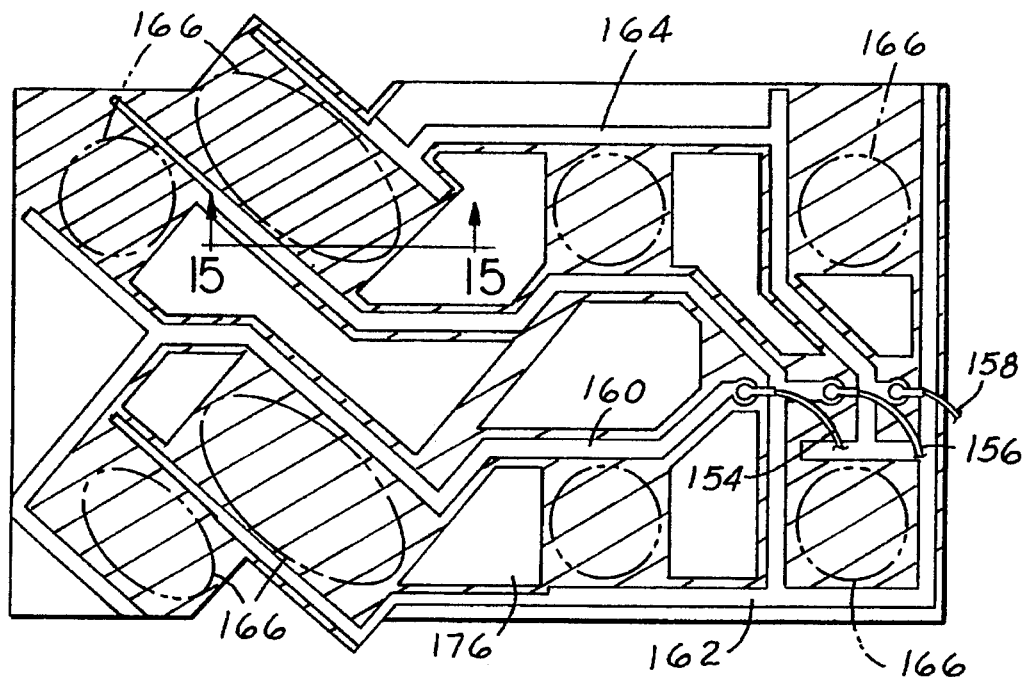
FIG. 14 is a plan view of the heater element assembly, depicting the effective heating circuit and heated areas.
Figure 15:
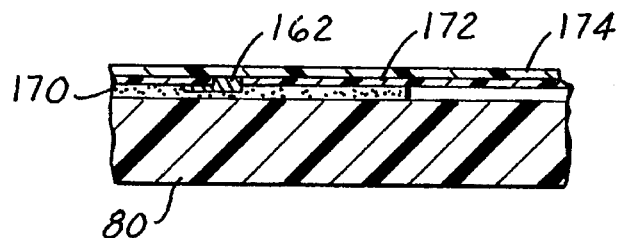
FIG. 15 is a sectional view taken along the line 15—15 in FIG. 14.

Attention is now directed to FIGS. 13, 14 and 15 which depict the details of a heating system 152 for heating selected portions of the cover 80 in order to melt and/or prevent the formation of ice or snow on the exterior surface of the cover 80. The heater system 152 comprises a flexible sheet-like assembly of sandwiched construction. As best shown in FIG. 15, the heater system 152 comprises an optically transmissive flexible substrate 174 such as Mylar®, which may be, for example, 0.0007 of an inch thick. An electrically conductive layer 172 of optically transparent material such as indium tin oxide (1 micron in thickness, for example), is applied, as by sputtering techniques, to one side of the substrate 174. Electrically conductive bus bars 162 are formed on the substrate 174 in electrical contact with the heating elements 172 in order to deliver electrical current to the heating elements 172. The conductive bus bars 162 may comprise, for example, a silver bearing polymer ink. The sandwiched assembly of the substrate 174, heating elements 172 and bus bars 162 is applied and secured to the inner face of the cover 80 by means of a suitable adhesive 170 which may comprise, for example, a high-performance silicone such as that manufactured by the 3M Company.

The bus bars 162 are coupled with electrical leads 154–158, which are in turn coupled with a suitable control system and source of electrical power. Leads 154 and 158 are coupled together with a jumper and together form one terminal, while lead 156 forms the other terminal of opposite polarity. Referring particularly to FIG. 14, the heating elements 172 of indium tin oxide are designated by the cross-hatched areas and cover only those portions 166 through which the beams of optical energy are projected through the cover 80. The remaining portions of the substrate 174 and thus the cover 80 remain unheated, thus substantially reducing the amount of current required to provide the necessary melting.

A later-discussed thermistor mounted within the cover 80 produces a signal which results in the heater system 152 being actuated when the temperature falls below a preselected value, such as 5 degrees C. Another thermistor mounted on the cover 80 likewise turns off the heater at a higher preselected temperature, such as 55 degrees C.

Figure 16:
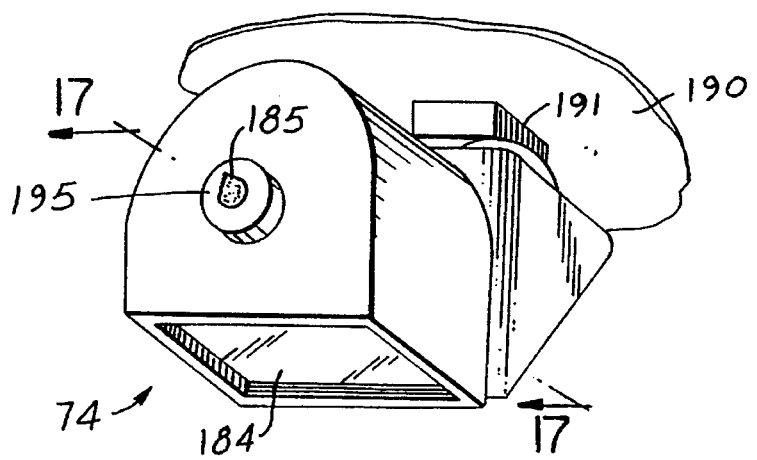
FIG. 16 is a perspective view of one of the visual enunciators.
Figure 17:
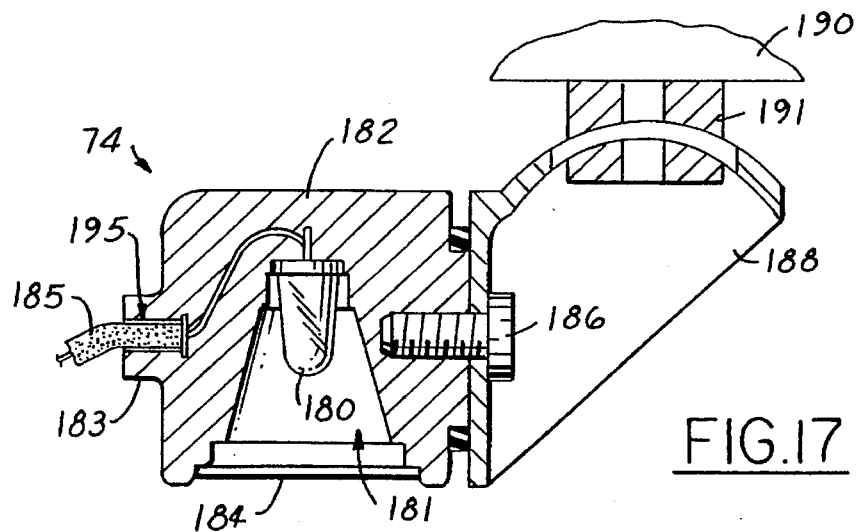
FIG. 17 is a cross-sectional view of the visual enunciator shown in FIG. 16.

Reference is now made to FIGS. 16 and 17 which depict the details of the visual enunciator 74 previously discussed in connection with FIG. 4. A housing 182 contains a light bulb 180 within a reflecting cavity 181 which is covered by a sheet 184 of translucent, colored material, such as plastic. The housing 182 is pivotally connected to a bracket 188 by means of a stud 186. A bracket 188 in turn is swingably mounted by means of a pivot connection 191 to a portion of the interior of the host vehicle, thus allowing the housing 182 to be pivoted by the user about two independent axes in order to properly orient the housing 182 so that it may be easily viewed by the driver. An opening 195 in a stress-relief boss 183 receives an electrical line 185 for supplying electrical power to the bulb 180.

Figure 18:
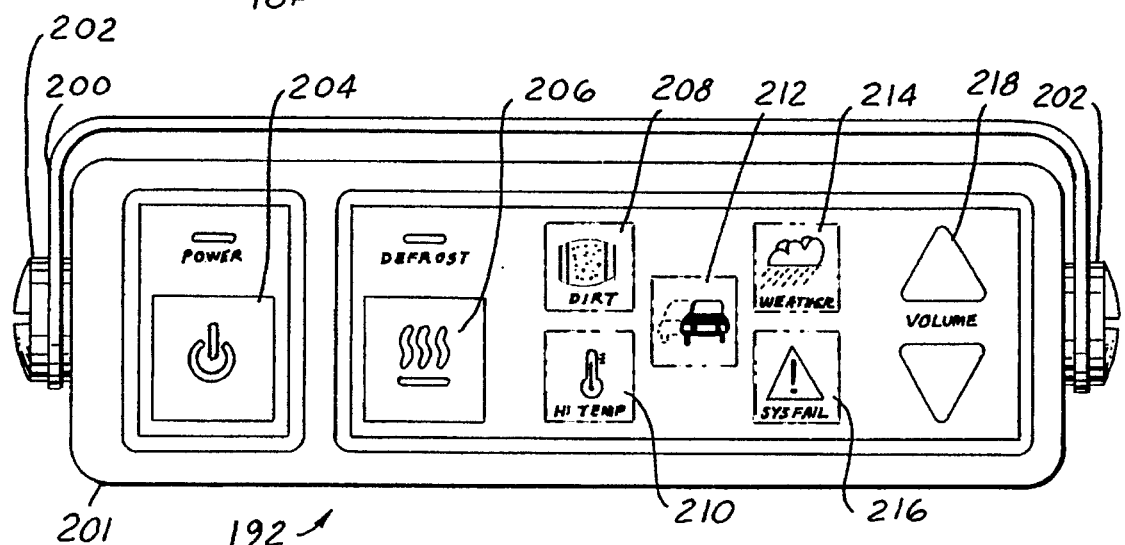
FIG. 18 is a front elevational view of the operator's controller.

FIG. 18 depicts the previously discussed controller 192 in more detail and shows the various controls and visual enunciators. The controller 192 includes a housing 201 pivotally mounted on a structural portion of the interior of the vehicle by means of a bracket 200 and screws 202. A touch-type power button 204 energizes the entire system. A defrost button 206 allows the driver to manually actuate the previously discussed heater system. A touch-type, up/down volume control 218 allows the driver to increase or decrease the volume of an audible enunciator which announces the detection of a vehicle or other object within the monitored zone 56. The remaining items on the face of the controller 192 comprise visual enunciators or alarms. Illumination of lamp 208 provides an indication that an accumulation of dirt or other foreign matter on the exterior surface of the cover 80 is preventing proper operation of the system. Lamp 210 alerts the driver when the temperature inside the cover 80 rises to an unacceptably high level which may affect the performance of the system. Lamp 214 alerts the driver when weather conditions, such as snow, rain, etc. prevent reliable detection of objects within the monitored zone. Lamp 216 alerts the driver in the event of any type of system failure, but alternately can be employed simply as a general monitoring alert which advises the driver that the system may not be operating properly for reasons that are not specifically identified, including environmental conditions that may affect system reliability. Finally, lamp 212 is illuminated when an object or other vehicle is detected within the monitored zone.

Figure 19A:
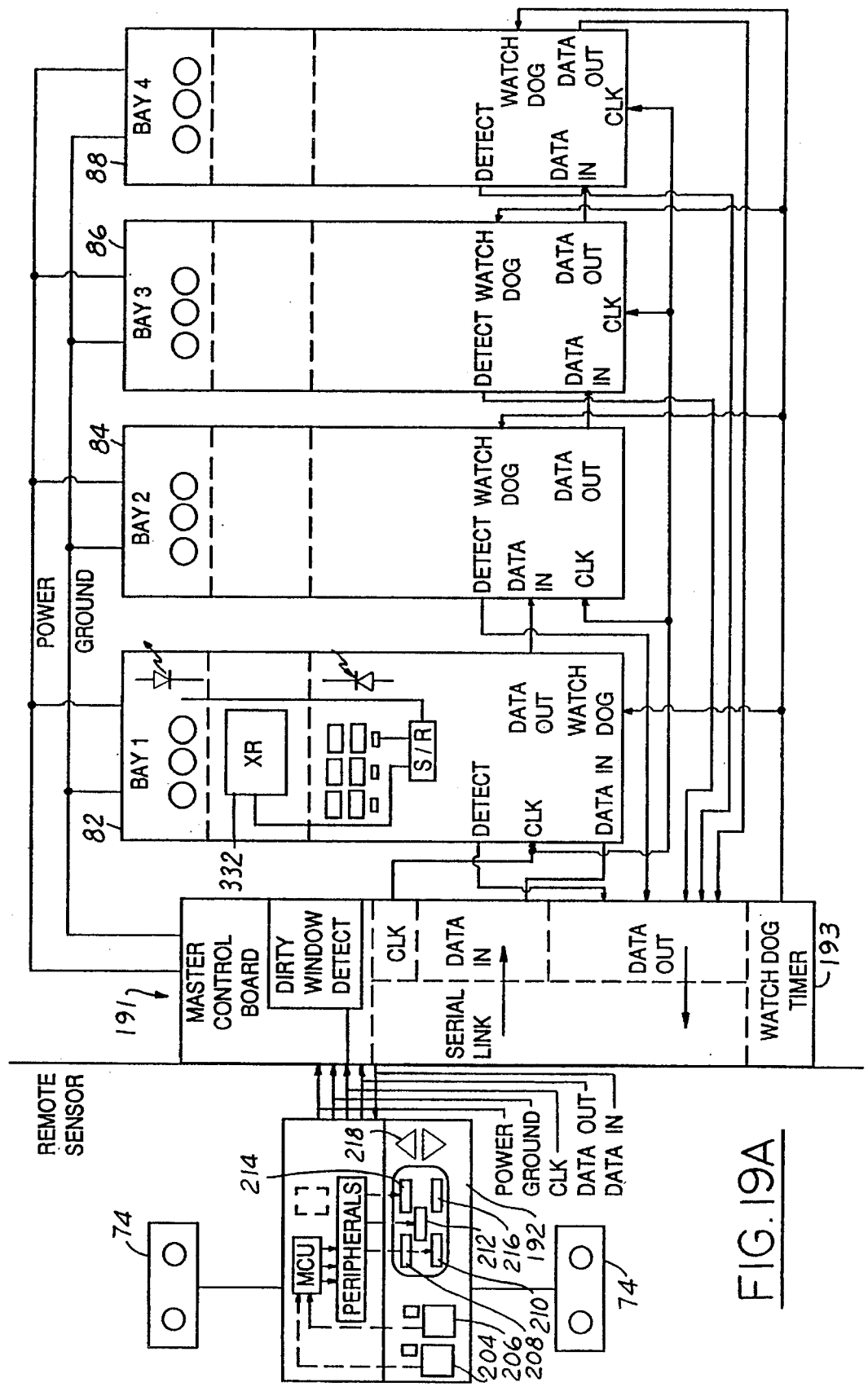
FIG. 19A is an overall block diagram of the electrical portion of the detector system.
Figure 19B:
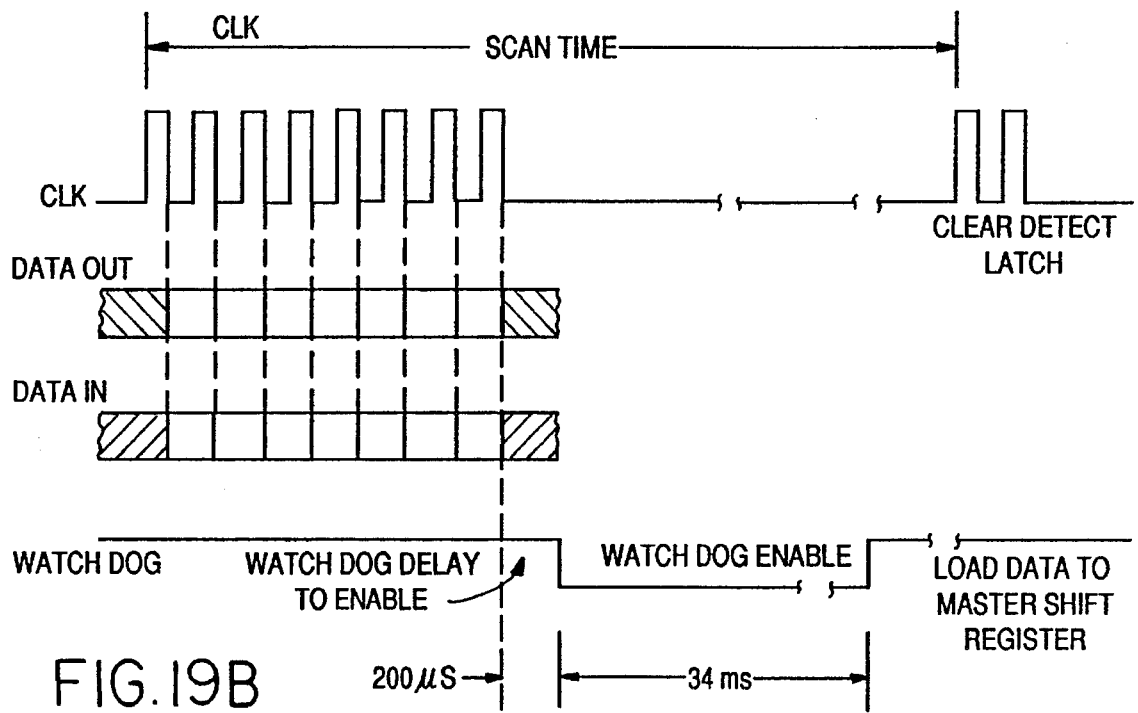
FIG. 19B is a series of waveforms useful in explaining scanning of signals produced by each of the sensor systems.

Reference is now made to FIGS. 19A–19G which depict the details of the electronic control portion and circuit for the detection system of the present invention. Referring first to FIG. 19A, the controller 192 and its related main control system or board 191 issue control signals and provide annunciation signals to all other units. Its main function is to control the sequence of scanning of the detection modules 82–88 and to issue an alarm when an object is detected within the monitored zones. Specifically, the controller 192: actuates an internal audible alarm; the previously discussed visual alarms; produces indications of a fault in the system; communicates with the detection modules 82–88 over a serial data link; and provides power and ground to the detection modules 82–88. The information sent out by the controller 192 is a serial stream of data along with a clock signal so as to synchronize the data; this data is received by the master control board 191 and is then output to each of modules 82–88 or "bays" using the same clock signal. The clock signal is also fed to a watchdog timer 193. Activation of the clock marks the start of a new sequence of scanning which fires the watchdog timer 193. The watchdog timer 193 functions to disable all of the bays 82–88 so that as data is being output from the master control board 191 to the individual bays 82–88, the latter are disabled from functioning during such data transfer.

After a preselected amount of time has elapsed following the completion of the data transfer, the watchdog timer 193 enables all of the bays 82–88 and they are then enabled to use the information that has been transferred to them in order to perform detection scanning. The disabling of the bays 82–88 functions to prevent the previously discussed emitting means (LEDs) 134 from being powered up and also to prevent a later discussed transmit chip from operating during that period of time because data in the bays during such period of time may not be valid until the data transfer is totally complete. In other words, the data is locked in or frozen in effect for a period of time during which it is clocked through the various registers of the bays 82–88 and thence back to the controller 192.

More specifically, when the watchdog timer 193 is enabled (goes high), data is latched from the previous scan into the return system so that it remembers everything that happened but does not bring any new data in during the active period of the clock signal. At the same time that the clock signal is active in transferring data out to the bays 82–88, it is transferring data back to the controller 192 from the master controller board 191. The foregoing operation and sequences are illustrated in the timing diagrams shown in FIG. 19B.

There is an initial burst of clock signals, specifically eight clock pulses, which synchronize the input and output data. When the data is output to the bays 82–88, the clock signal then rises which latches in the input data and latches out the output data. In one suitable embodiment, the clock pulse duration is approximately 16 microseconds, possesses a 60 kilohertz clock rate, and lasts for a duration of eight clock pulses. These eight clock pulses set up the scan and send out the information that the system needs in order to commence this scan. The period of time from one set of clock pulses to the next is the actual scan time; the corresponding period is approximately 34 milliseconds. During this time, after the clock pulses have ceased, there is a brief delay to allow the watchdog delay to enable following which the system is enabled. During the enabled time period, the emitting means 134 are pulsed, i.e., the beams of infrared energy are sent out into the monitored zone, and information contained in the reflected light is collected to determine whether an object or vehicle is present within the monitored zone 56. Once the watchdog enable times out, it latches the data into the system so that no more data is read, and at that point the transmit (EXAR) chip 332 and each bay 82–88 is disabled.

The EXAR chip 332 is a modulator/demodulator device manufactured by Opcon, Inc. of Everett, Wash. and identified by Opcon's part number 106935. The EXAR chip 332 functions to pulse drive the LEDs 134 and detects reflected light with a pulse character synchronous with the signals that drive the LEDs 134, i.e., pulse synchronous detection.

The scanning and intermittent transmission of data is essentially continuous. There is a very short time between the time the watchdog enable goes high which disables all the bays, and the next set of clock pulses. In this manner, using a watchdog timer, the LEDs are not driven continuously, which LED could be cycled. In other words, it controls the maximum duration of "on time" and the maximum number of cycles for each LED, not only to save power but to substantially extend the life expectancy of the LEDs, particularly under elevated, overtemperature conditions. Also, this arrangement functions as a fail-safe mechanism since, if for some reason, communication is lost between the controller 192 and the remote modules 50, as where a line may be broken, the LEDs will run continuously until they burned up, which would occur in only a matter of a few seconds because of the extremely high operating currents that are involved. In the illustrated embodiment, the effective duty cycle of the LEDs is only approximately one percent.

The data transferred from the controller 192 to the master control board 191 and remote detector module 50 is passed onto the first bay 82, and more particularly to the first bay's serial shift register 330. As soon as the clocking-in of data is finished, the watchdog 193 enables (goes low) or "pulses" the LEDs to strobe. At the end of this timing sequence, when the next burst of clock signals occurs, the data that was shifted into the first bay 82 is then shifted into the second bay 84, and this cycle is repeated so that now there is one set of information in the first bay 82 and a second set of information in the second bay 84. Upon successive cycles, the original information moves into bay 86 and thence into bay 88. During each cycle, a new set of data is moved into bay 82 and that same data propagates down through all of the bays, however, on each cycle, a new set of data comes in so that each bay is operating on a new set of data. This data information is passed back to the control system 191, thence to the MCU (micro controller unit) in the controller 192. However, ahead of this data input to the controller 192 there is loaded in, in a parallel fashion, various check functions for undervoltage and overtemperature derived from the master control board 191. This information is passed on and serial data from bay 88 is shifted into this same shift register in bay 88.

Referring now particularly to FIG. 19C, as previously discussed, the data out, i.e., the data in the clock, all originates within the MCU. The output data and the clock lines are signal conditioned so that the voltage transitions are slow rate limited to prevent radiation in excess of FCC limitations and to prevent cross talk over the serial link lines. Signal conditioning in the remote detector unit 50 functions to square the edges of the clock and data as required, various tests are performed by and within the master control board 192. One of these tests is the dirty window detection which tests for accumulation of film on the optical surfaces to determine whether the signals might be unreliable. An over-temperature test is also performed which checks the internal temperature of the remote detector unit 50 in order to determine whether a certain temperature has been exceeded; this is important for a number of reasons including the fact that the LEDs would burn up if operated at elevated temperature. Further, there is an under voltage indicator which announces when an insufficient amount of voltage is being supplied which would otherwise affect the operation of the LEDs and thus the reliability of the overall system. The circuits mentioned above are part of the master control board 191. All of the test data is loaded into the master register 362 along with the detect data in parallel form. Eight bits of data are loaded into the master chip register at the end of the watchdog enable time period.

In terms of sequence of operation, the data is output from the MCU onto the serial link line. Once this data is present on the line, the clock line clocks the data into the serial shift registers in the bays 82–88. It clocks this information first into bay 82 which is in turn connected in a daisy chain fashion to bay 84 and from bay 84 to bay 86 and from bay 86 to bay 88. Thus, as data is clocked in on the next clock signal, the data that was clocked into bay 82 will be clocked into bay 84, and so on to bays 86 and 88. When the data is clocked in, the watchdog timer sets up and begins to wait for end of the clock signals and when the clock signals end when the data transfer is finished, the watchdog enable has a slight delay and then enables the bays 82–88 to operate. In other words, the data is loaded into all of the bays 82–88 and when all of this data is loaded in, the circuitry is enabled to act on the command which specifies which beam in each bay will be actuated by gating on its corresponding LED and enabling the pulsed LED device circuitry of the EXAR chips 332. In other words, the pulses are applied to the LEDs to strobe them. The EXAR chips 332 become active when they drive the LED drivers. The serial chip register shifts in the data that includes information revealing which LED is going to be driven, and that information is shifted in parallel to the LED drive select which selects which LED is connected to the LED driver so that the EXAR chip pulses the LED driver and infrared light is emitted into the zone 56, bounces off the target and is picked up by the detector 44 whose outputs are processed by the EXAR chip 332. At this point, it is determined whether an object is present in the monitored zone 56, and if so the detect signals are sent back to the master control unit 191 to latch in any detected information. The bays continue to send out LED pulses during the time that the watchdog timer enables them. This could be any number of pulses, however it the present embodiment, approximately 14 LED pulses are employed at which point, after these 14 pulses are developed, the watchdog timer times out and disables all of the bays and any information concerning a detect that may have been latched into the RS latch is loaded in parallel fashion into the parallel shift register.

At the end of the watchdog enable pulse, the data is loaded in from the latch into the master shift register and then the detect latch is cleared with the next burst of clock pulses. This is the detect latch that latches the shift data in and transfers it to the master register.

At this point in the sequence, the detect data has been parallel-loaded into the master data register. As the watchdog timer times out, the data that is latched into the detect latch is parallel-loaded into the parallel shift register, and at the same time, all of the bays 82–88 are disabled. All activity in the system ceases until the next of burst of clock signals is originated at the master controller 192 by the MCU. At the beginning of the next burst of clock signals, the detect latch is cleared, the watchdog timer is triggered which begins a timing sequence, and each clock pulse that comes in retriggers the watchdog timer until the last clock pulse comes in, at which time the watchdog timer receives its last trigger, and 200 microseconds from the time the watchdog timer receives its last trigger, it enables the bays 82–88 to pulse the LEDs and pick up an additional set of data for approximately the next 34 ms.

Figure 19F:
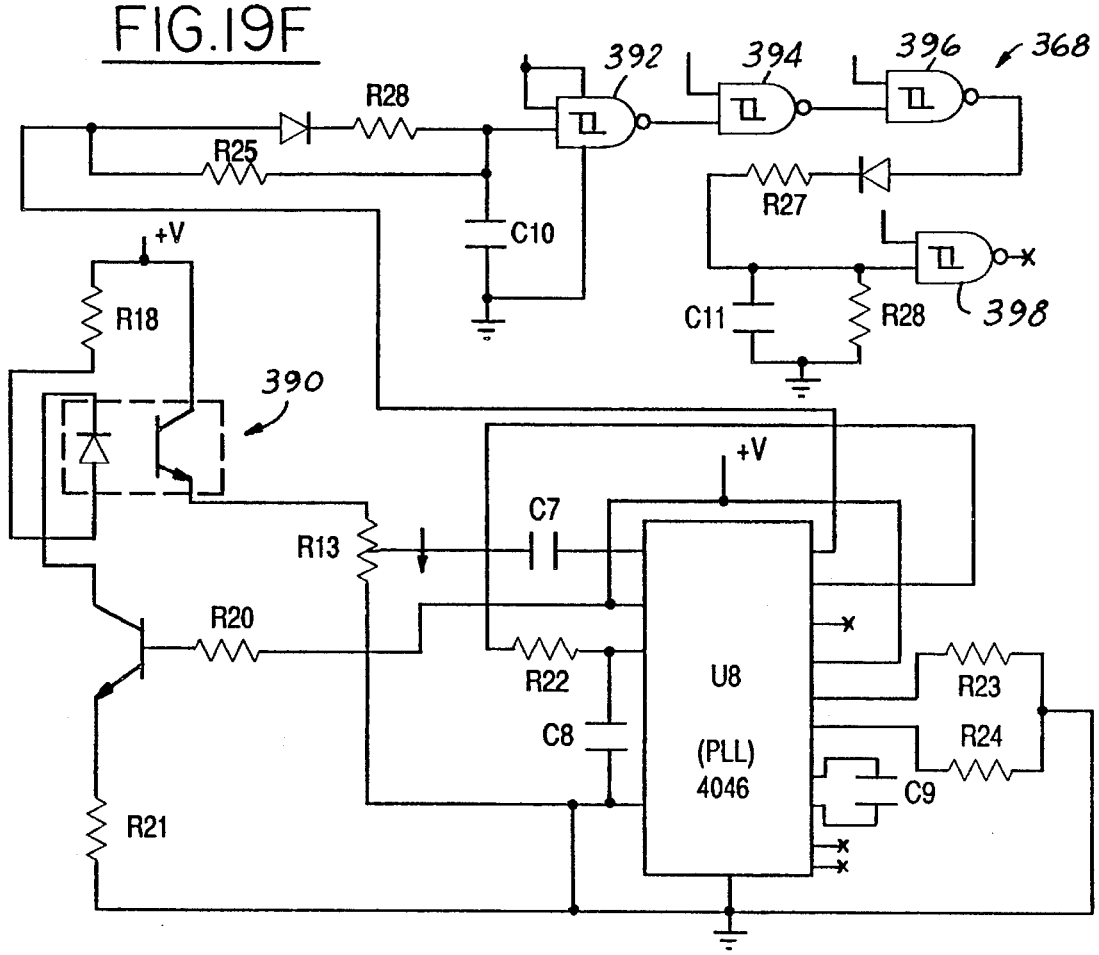
Figure 19D:
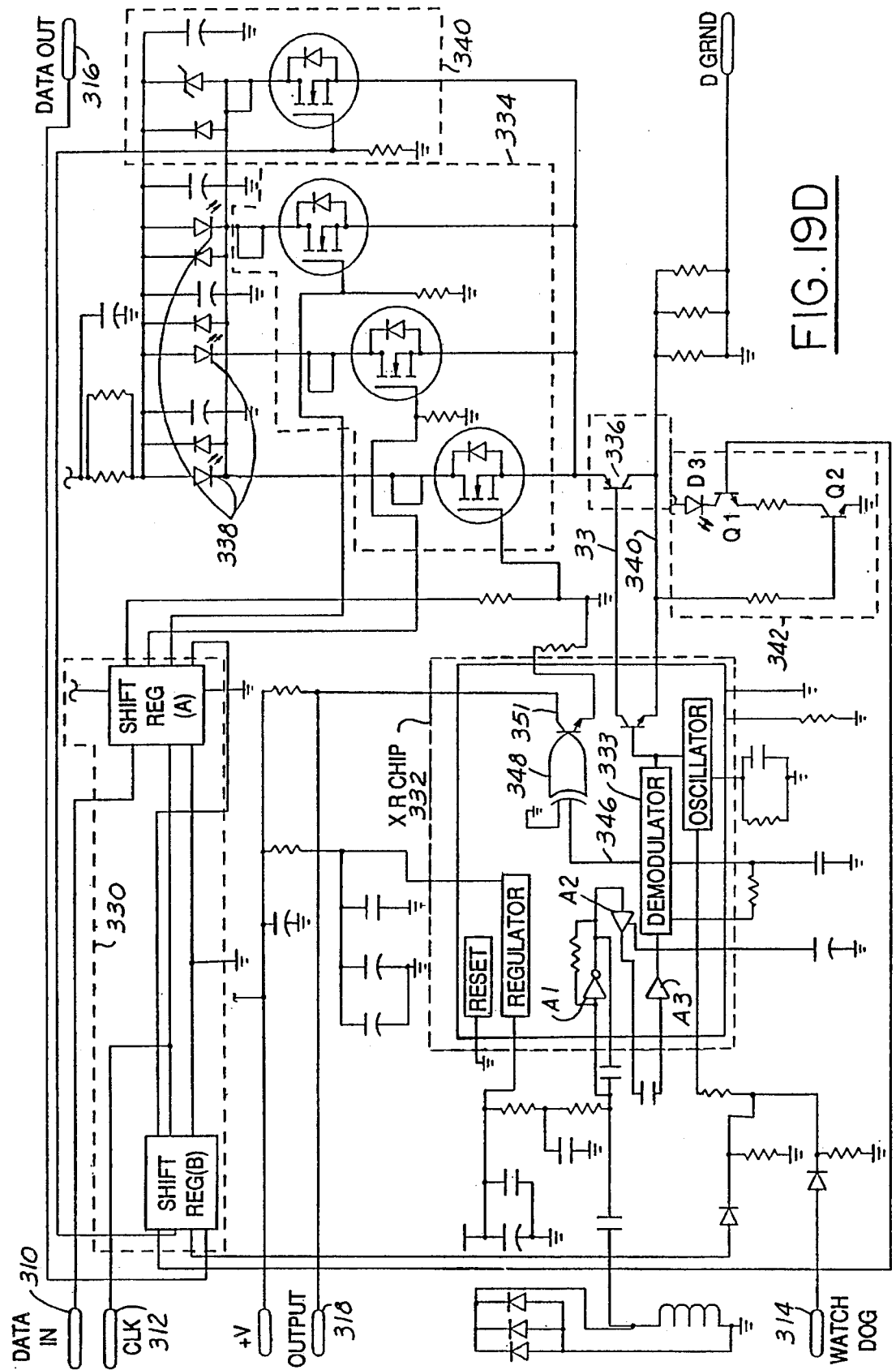
Figure 19E:
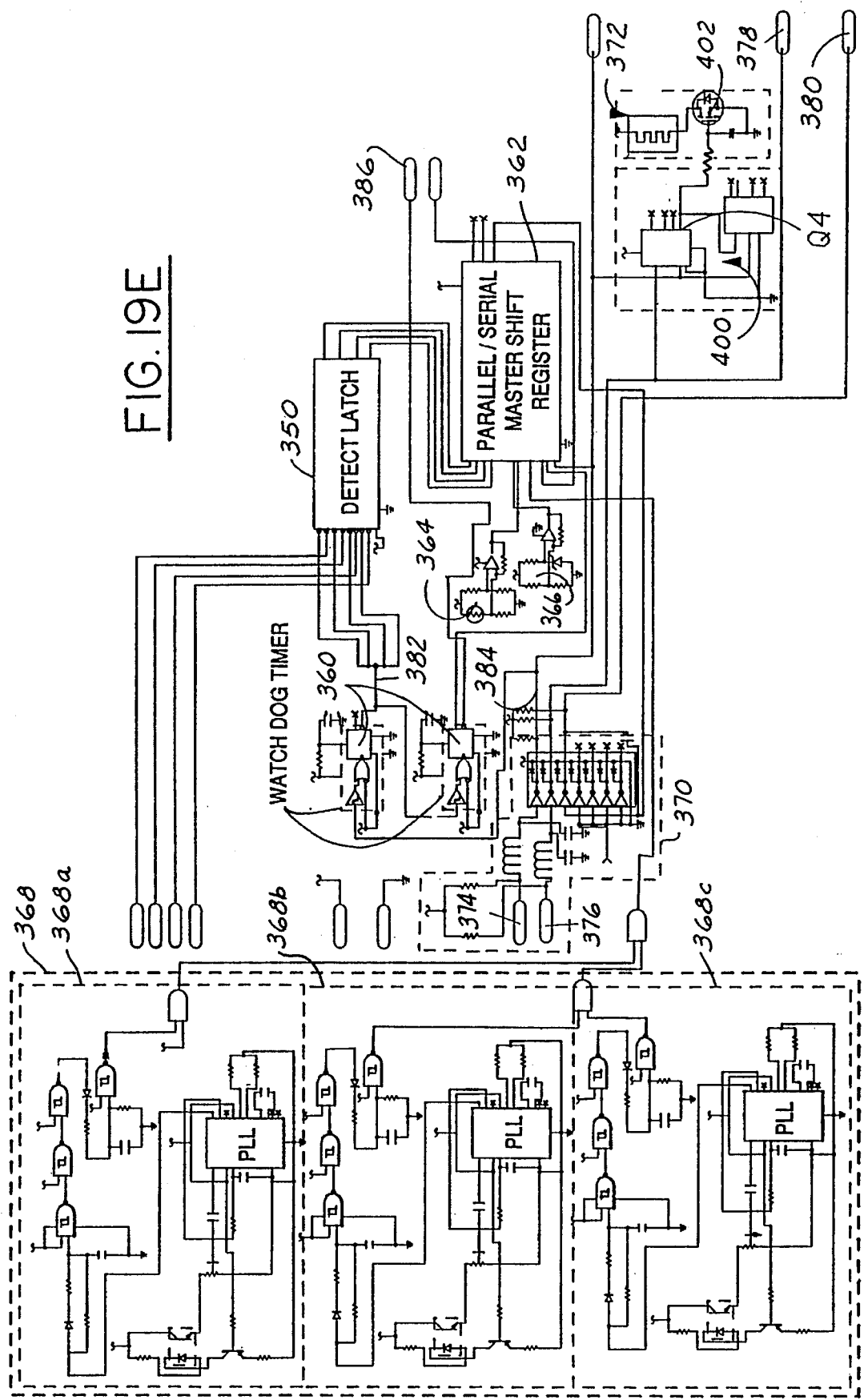

Attention is now directed to FIG. 19D which depicts the details of the electronics associated with a single one of the bays 82–88. Data shifts in along with the clock signals into the shift register 330. Then when the EXAR chip 332 receives the enable signal from the watchdog timer on line 314, the chip is enabled, the chip register selects one of the LEDs 338 to be tuned on, and the selected LED is then pulsed by the EXAR chip 332 for fourteen pulses, typically. Then, at the end of these pulses, the watchdog timer times out, and the chip is disabled. The new data then shifts in, a new LED is selected, the watchdog timer enables the chip again, and the entire sequence is repeated. The incoming signal to the photodetector is amplified and demodulated; if there is a detection, then this detection information is output on line 318 and is subsequently latched in at the master controller 192. The data shifted in on line 310 into section A of the shift register enables a specific LED that was selected by that particular set of data and is then shifted through section A into section B in a similar manner. The selected outputs are Q1–Q4. Q1–Q4 comprise the outputs of each section and are enabled depending upon the nature of the data that was transmitted. The data is shifted in with the clock pulses with a series of these pulses. Then at the end of the clock pulses, there is a slight delay, and the watchdog timer line 314 is then enabled which turns on the EXAR chip 332. The EXAR chip 332 is selected by the data in the shift register. Specifically, the EXAR chip 332 is selected by line Q3 from section B of the shift register which goes to the external synch line on 332 of the EXAR chip 332. The EXAR chip 332 is enabled when both the watchdog timer and the shift timer select the chip; in this manner, it is possible to turn on any particular bay. The EXAR chip 332 is also enabled by data shifted into section B of the shift register 330. Enabling of the EXAR chip 332 enables the LED drive 336. Thus, output 338 goes low to turn on the base of transistor 336. Then, line 340 is a current-sensing line which controls the amount of current going through the LED and looks for a single pulse. The shift register selects an individual LED driver at 334.

The purpose of the above-mentioned off test is to assure that there is no cross-coupling or similar phenomena that is yielding a detect, so that the LED driver is selected which turns on diodes 338 so that no light is output, but the same amount of electrical current is going through the LED drive circuit. This turns on the diode in the portion of the circuit labeled as 340. The advantage of this arrangement is that, since the LEDs do not emit any light, it is assured that there is no optical cross-coupling; thus, if there is any detection during this time period, it will be known that it is a false detect. During the "off" test, all LEDs 338 are turned off but the line 340 remains on. Then, the "on" test is performed simply by turning on the transistor in section 342 which is labeled Q1. This transistor turns on the LED designated as D3 which is placed directly over the photodiodes. If there is no detect during the on test, then it is known that there is a system failure. Selecting an LED and performing the on test at the same time assures that the LED is operating since it is known that there has to be current flowing through the LED in order to enable the on test so that it can be verified that all the LEDs are functional, since if they fail, they will do so in an open-circuit mode.

When a detect signal is received by the photodiodes, these diodes produce a current, and this signal is then AC-coupled onto the amplifier section of the EXAR chip 332, which includes several stages of gain and then is processed by the demodulator and is output to produce the alarms. More particularly, the detect signal is amplified by amplifier A1, then again by A2, and finally, again by A3. The demodulator 333 functions to provide noise sampling, and it is then determined whether or not the signal is above a preselected threshold.

The demodulator 333 is operative to take a sample of the noise present throughout the previous amplifier section, just before the pulse is measured in amplitude. Then, during the pulse, the noise is again measured along with the signal detected from the photodiodes, and the noise that was first measured is then subtracted so that all that remains is the signal. This signal is compared to the threshold, and if it exceeds the threshold, then the output logic provides a detect signal forcing line 318 to go low. Once the demodulator 333 has compared the noise before the signal to the noise during the LED pulse, the signal is output from the demodulator on line 346 which is processed by output logic 348, forcing the transistor 351 to turn on, thereby causing output line 318 to go low. Before this output is delivered to the master shift register, it is provided to the detect latch 350, which is an RS latch located on the master control board and is reset at the end of each watchdog pulse.

Attention is now directed to the details of the master control board 191 which receives as it inputs the clock and data lines from the MCU, along with some signal conditioning. Lines 374 and 376 are received into the peripheral driver of section 370 which comprises the signal conditioning. The signal conditioning section 370 is a Darlington array whose outputs are delivered to the parallel 12 serial master shift register 362 which is an eight bit parallel-in, serial-out register. This shift register includes an input clock line and output data line which is connected with the shift registers in the bays 82, 88. This latter-mentioned line is designated by the numeral 378. This data goes out and comes back in after it is shifted through bays 82–84 and more particularly is returned to the master shift register. Then, the individual outputs of each bay are received in a parallel fashion, the detects come through the detect latch 350, and the test conditions of over temperature, under voltage, and dirty window detection are received in a parallel fashion into the parallel serial master shift register and are loaded in at the end of the watchdog enable. This information is loaded in and becomes serial data which is output through the data output line to the controller unit 192 and then are similarly conditioned by section 370 and delivered back to the controller 192. The watchdog timer is used to reset the detect latch and to enable the LED pulses. It is also used to load the parallel data into the master shift register and to convert it into serial data.

The watchdog timer includes two sections. A first section receives as its trigger a clock pulse which causes its output line 382 to go high. Its trigger input is the clock signal received on line 384. It is triggered on each successive pulse of the clock, and after the last eight clock pulses, there is a short delay of 200 microseconds, following which the watchdog timer goes low, triggering the second half of the timer which is enabled for 32 milliseconds.

The output enable is delivered on line 386; when this line goes low, the EXAR chip is turned on. At the low-going edge of this pulse, the data is shifted into the parallel-serial register and is delivered to the controller 192. The over-temperature section 364 is implemented using a thermistor to determine when the temperature exceeds a selected temperature. The under-voltage test is performed by comparing the input voltage of a Zener reference. The dirty window detector provides an input into the parallel serial master shift register. The dirty window detector is designated by the numerals 368a, 368b, 368c in FIG. 19E. One of these sections is depicted in FIG. 19F. The dirty window detector employs a phase lock loop which operates by outputting a pulse delivered to a photo switch labeled as 390 which is a combination of an LED and a photodetector. This LED is located very close to the detector and has a very short range of approximately one-and-a-half inches. The LED is pulsed by the phase lock loop. The detector takes this input, delivers it through a potentiometer and couples back to the input of the phase lock loop. Then, the signals are compared, and when they exceed a threshold, an output signal is generated. The output is then filtered by hysteresis AND gates 392–398 which permit a triggering to eliminate noise. The Schmitt trigger and the output of the last AND gate 398 are combined with the other sections of the dirty window detector section 368b–368c and are combined into another AND gate which produces an output that forms the input to the master shift register. The phase lock loop mentioned above searches for its own signal and is employed as a demodulator. The phase lock loop looks for signals of a given frequency, and since the frequency of the LED pulsing is known, it is a simple matter to detect such modulated signal above a certain threshold value.

The LED and the dirty window photoswitch section 390 of the dirty window detector are located remote from the remaining portion of the electronics and the phase lock loop, as well as the filtering electronics. Typically, the electronics for the dirty window detector will be located on the master control board 191, but the photoswitch will be located against or in close proximity to the inside face of the cover 80, preferably at some small angle to the interior surface of the cover 80.

The previously discussed heating system is enabled by a shift register 400 which is similar to the shift registers employed for the detector phase. One output of shift register 400 designated as Q4 enables the transistor 402 which in turn turns on the heating system.

Having thus described the invention, it is apparent that the detection system of the present invention not only provides for the reliable accomplishment of the objects of the invention, but does so in a particularly economical and efficient manner. It is recognized, of course, that those skilled in the art may make various modifications or additions to the preferred embodiments chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

What is claimed is:

1. Collision avoidance apparatus mounted on a host vehicle to detect the presence of an adjacent vehicle within a monitored zone, comprising a detector module mounted on the host vehicle including a plurality of discrete sensor systems, characterized by each of said sensor systems comprising emitting means for emitting a beam of light energy into a unique portion of the monitored zone, sensing means, having a field of view that includes only said beam, for sensing the light energy of the portion of said beam which is reflected from a surface on the adjacent vehicle that occupies said portion of the monitored zone, and for generating detection signals, and processing means for receiving and processing the detection signals generated by the sensing means of all of said sensor systems to determine the presence of the adjacent vehicle in the monitored zone.

2. The collision avoidance apparatus of claim 1, further characterized by including control means which generate control signals to sequentially and intermittently operate the emitting means and the sensing means.

3. The collision avoidance apparatus of claim 2, further characterized by the processing means including means for sequentially scanning the sensing means to evaluate the generated control signals to determine the presence of the adjacent vehicle in the monitored zone.

4. The collision avoidance apparatus of claim 3, further characterized by the control means including testing means for operating the emitting means and the sensing means in a test mode to determine operability of the sensor system.

5. The collision avoidance apparatus of claim 4, further characterized by the apparatus including an outer cover having portions transparent to the emitted light energy, and the testing means includes means for detecting when the transparency of the outer cover is reduced below a predetermined amount due to dirt accumulation.

6. The collision avoidance apparatus of claim 4, further characterized by the control means including data communications means for communicating output signals indicating the operability status of the sensing means and for communicating the presence of the adjacent vehicle in the monitored zone.

7. The collision avoidance apparatus of claim 1, further characterized by the monitored zone extending laterally and rearwardly of the host vehicle and the unique portions being arranged in a predetermined pattern to enable the emitted beams to detect the adjacent vehicle in any portion of the monitored zone.

8. The collision avoidance apparatus of claim 1, further characterized by each of said emitting means including an emitting device for emitting a beam of infra-red energy and a mounting element supporting the emitting device and aiming the beam into the unique portion of the monitored zone, the mounting element including a depression and surrounding walls which confine the emitting device and aim the beam.

9. The collision avoidance apparatus of claim 8, further characterized by the detector module including a printed circuit board for mounting the mounting elements, wherein each said mounting element is arranged on the printed circuit board as a function of the location of the beam in the predetermined pattern in the monitored zone.

10. The collision avoidance apparatus of claim 8, further characterized by including beam shaping means on each of said mounting elements for preventing sensing of light energy which is reflected from a surface located beyond the monitored zone.

11. The collision avoidance apparatus of claim 10, further characterized by the beam having a generally oval shape and the beam shaping means comprise surfaces on the mounting element surrounding walls which truncate the ends of the oval beam.

12. The collision avoidance apparatus of claim 8, further characterized by including an outer cover having portions transparent to the emitted light energy, and means heating the transparent portions to prevent accumulation of frozen moisture thereon.

13. The collision avoidance apparatus of claim 8, further characterized by the emitting devices being LEDs and the sensing means include photosensitive detectors.

14. The collision avoidance apparatus of claim 8, further characterized by each of said sensor systems comprising a single LED as the emitting device for emitting a beam of infra-red energy and a pair of photosensitive detectors as said sensing means, one of said detectors providing the processing means with a signal of polarity opposite from that of the other of said detectors when sensing light energy reflected from the emitted beam of infra-red energy to enable the processing means to discriminate between energy from beam portions reflected from surfaces within and beyond the monitored zone.

15. Collision avoidance apparatus mounted on a host vehicle to detect the presence of an adjacent vehicle within a monitored zone, comprising a plurality of detector modules mounted on the host vehicle including a plurality of discrete sensor systems, characterized by each of said sensor systems comprising emitting means for emitting a beam of light energy into a unique portion of the monitored zone, sensing means, having a field of view that includes only said beam, for sensing the light energy of the portion of said beam which is reflected from a surface on the adjacent vehicle that occupies said portion of the monitored zone, and for generating detection signals, and processing means for receiving and processing the detection signals generated by the sensing means of all of said sensor systems to determine the presence of the adjacent vehicle in the monitored zone.

and control means which generate control signals to sequentially and intermittently operate the emitting means and the sensing means of all said sensor systems.

16. The collision avoidance apparatus of claim 15, further characterized by the sensing means in said detector modules being connected in series for sequential operation, and the control means include means for storing control signal data, the processing means analyzing the stored data to determine the presence of the adjacent vehicle in the monitored zone.

17. The collision avoidance apparatus of claim 15, further characterized by each of said emitting means including an emitting device for emitting a beam of infra-red energy and a mounting element supporting the emitting device and aiming the beam into the unique portion of the monitored zone, the mounting element including a depression and surrounding walls which confine the emitting device and aim and shape the beam.

18. Collision avoidance apparatus for use on a host vehicle to detect the presence of an adjacent vehicle within a monitored zone, comprising a detector module mounted on the host vehicle including a plurality of discrete sensor systems, each of said sensor systems comprising an LED for emitting a beam of infrared energy into a unique portion of the monitored zone, sensing means having a field of view that includes only said beam and including a photodetector for sensing the infrared energy of said beam which is reflected from the adjacent vehicle when it occupies said portion of the monitored zone and for generating detection signals, and means for receiving and processing the detection signals generated by the sensing means of all sensor systems to determine the presence of the adjacent vehicle in the monitored zone.

* * * * *